United States Patent
Iversen et al.

(10) Patent No.: US 11,976,243 B2
(45) Date of Patent: May 7, 2024

(54) PRODUCT SEPARATION AND PURIFICATION METHOD AND SYSTEM

(71) Applicant: STEEPER ENERGY APS, Vedbæk (DK)

(72) Inventors: Steen Brummerstedt Iversen, Vedbæk (DK); Claus Uhrenholt Jensen, Vodskov (DK); Henrik Egholm, Hjørring (DK); Anders Bach Velling, Aalborg (DK); Esben Ravn, Aalborg (DK)

(73) Assignee: STEEPER ENERGY APS, Vedbaek (DK)

( * ) Notice: Subject to any disclaimer, the term of this patent is extended or adjusted under 35 U.S.C. 154(b) by 196 days.

(21) Appl. No.: 17/785,609

(22) PCT Filed: Dec. 16, 2020

(86) PCT No.: PCT/EP2020/025584
§ 371 (c)(1),
(2) Date: Jun. 15, 2022

(87) PCT Pub. No.: WO2021/121662
PCT Pub. Date: Jun. 24, 2021

(65) Prior Publication Data
US 2023/0030413 A1 Feb. 2, 2023

(30) Foreign Application Priority Data
Dec. 16, 2019 (DK) .......................... PA 2019 01482

(51) Int. Cl.
*C10G 53/04* (2006.01)
*C10G 53/10* (2006.01)

(52) U.S. Cl.
CPC ............. *C10G 53/04* (2013.01); *C10G 53/10* (2013.01); *C10G 2300/1003* (2013.01);
(Continued)

(58) Field of Classification Search
CPC .......... C10G 3/00; C10G 33/00; C10G 53/04; C10G 53/10; C10G 2300/1003;
(Continued)

(56) References Cited

U.S. PATENT DOCUMENTS

2020/0056107 A1\* 2/2020 Iversen .................. C10G 1/083

FOREIGN PATENT DOCUMENTS

| DK | PA201770234 | \* 11/2018 | ............... C10G 1/00 |
| WO | WO 2018/177877 A1 | 10/2018 | |

OTHER PUBLICATIONS

Sinnott, R.K., 2005, Chemical Engineering Design: Chemical Engineering vol. 6, 4th edition, Butterworth-Heinemann, 1064 pp [Office action cites Table 10.1 on p. 402]. (Year: 2005).\*

(Continued)

*Primary Examiner* — Brian A McCaig
(74) *Attorney, Agent, or Firm* — Birch, Stewart, Kolasch & Birch, LLP

(57) ABSTRACT

The invention relates to a method of separating and purifying products from a hydrothermal and/or solvothermal conversion process of carbonaceous material adapted to convert a feed stream comprising carbonaceous material at a pressure of at least 100 bar and a temperature of at least 300° C., where the converted feed stream (product mixture) comprises a mixture of $CO_2$ containing gas, an oil phase, an aqueous phase comprising water soluble organics and dissolved salts, and inorganic solid phase; where the product mixture is cooled to a temperature in the range 40 to 250° C., and depressurized to a pressure in the range 1 to 30 bar, the method comprising—separating a gas comprising $CO_2$ from the product mixture in a degasser such as a flash separator, and—separating a water phase from the at least partly degassed converted feed mixture in a first separation step of the separation, and adding washing agents in the form of an
(Continued)

acidifying agent and a diluent to the at least partly degassed and at least partly dewatched product mixture, and separating the mixture with added washing agents into an oil rich phase, a water rich phase and a solid rich phase in a second step of the separation process, and further at least partly recovering the diluent from the oil rich phase.

20 Claims, 10 Drawing Sheets

(52) U.S. Cl.
CPC ............... *C10G 2300/1011* (2013.01); *C10G 2300/201* (2013.01); *C10G 2300/4006* (2013.01); *C10G 2300/4012* (2013.01); *C10G 2300/802* (2013.01)

(58) Field of Classification Search
CPC ...... C10G 2300/1011; C10G 2300/201; C10G 2300/4006; C10G 2300/4012; C10G 2300/802; Y02P 30/20
See application file for complete search history.

(56) References Cited

OTHER PUBLICATIONS

International Search Report (PCT/ISA/210) issued in PCT/EP2020/025584, dated Jun. 2, 2021.
Written Opinion of the International Searching Authority (PCT/ISA/237) issued in PCT/EP2020/025584, dated Jun. 2, 2021.

* cited by examiner

PRODUCT SEPARATION AND PURIFICATION METHOD AND SYSTEM

FIELD OF THE INVENTION

The present invention relates to the area of separation systems for products from hydrothermal or solvothermal liquefaction of e.g. biomass & waste streams having a high content of inorganics, where efficient separation of inorganics from the hydrocarbon product is needed e.g. for further refining of the hydrocarbon product to finished fuel and/or for further separation and purification of the inorganic product e.g. into a phosphor rich product with low levels of contaminants.

BACKGROUND OF THE INVENTION

Numerous applications of high pressure continuous processes exist or are under development or in early stages of commercialization. Examples of such processes are hydrothermal and solvothermal processes e.g. for production of hydrocarbons such as transportation fuels, lubricants or speciality chemicals and gases from carbonaceous materials such as biomass.

The products from the high pressure conversion process typically comprise a pressurized mixture of renewable crude oil, gas, water with water soluble organics and dissolved salts and eventually emulsified renewable oil, and optionally suspended solids such as inorganics and/or char and/or unconverted carbonaceous material depending on the specific carbonaceous material being processed and the specific processing conditions.

Whereas various separation methods are known in the art, it has been found that carbonaceous material having a high content of inorganics (e.g. ash) present a particular problem in terms of separation. A general problem of such prior art separation systems is that the separated oil product, when produced from high-inorganic containing carbonaceous material, often contains too high levels of water and inorganics, which limits the quality of the oil (hydrocarbons) and its further use in e.g. catalytic upgrading processes to transportation fuels, lubricants or speciality chemicals.

A further problem with separated renewable crude oil products appears when the oil product has a significant content of inorganics. The inorganics content makes it difficult or even impossible to use the oil product in e.g. catalytic upgrading processes to transportation fuels, lubricants or speciality chemicals without significant efficiency losses e.g. of yields and also directly as a fuel in otherwise tolerant engines such as marine propulsion engines.

It has further been found that carbonaceous feedstocks comprising both a high inorganic content and a high nitrogen content can be particularly difficult to separate and may form a stable emulsion that only very slowly separates by gravimetric means or where the separation efficiency is insufficient by conventional processing. Examples of carbonaceous feedstock having a high ash content and a high nitrogen are sludges from waste materials such as sludges from waste water treatment such as biosolids, primary and secondary sludges, and digested sludges, industrial or municipal food wastes such as the biogenic fraction of household and municipal waste, manures and animal beddings from live-stock production, slaughterhouse wastes and coprocessing of such materials with other carbonaceous feedstock such as lignocellulosic feedstock.

Further resources such as phosphorous for fertilization are becoming scarce resources, and there an increasingly urgent need for more circular solutions not only efficiently producing renewable fuels, but also increasing the resource efficiency by recovering other useful by-products such a phosphorous product.

Accordingly, improved and more efficient schemes for separating and purifying the renewable oil such as inorganics from the oil phase and recovery of valuable and useful by-products produced from such high pressure processes are desirable.

Objective of the Invention

The object of the present invention is therefore to provide for an improved separation and purification method that reduces the amount of inorganics in a renewable crude oil product. Further objectives include providing a separation method for separating and purifying the inorganics from the product stream resulting from the conversion of a carbonaceous feed mixture by high pressure process. The invention aims at providing a contribution to the reduction of the carbon intensity, and a contribution to the circularity in raw material consumption, which will provide long term impact on sustainability in resources with limited availability, such as phosphorus and other nutrients. The aim is further to provide an option for removal of heavy metal as an additional beneficial contribution to the environmental impact.

DESCRIPTION OF THE INVENTION

According to one aspect of the present invention the objective of the invention is achieved through a method of separating and purifying products from a hydrothermal and/or solvothermal conversion process of carbonaceous material adapted to convert a feed stream comprising carbonaceous material at a pressure of at least 100 bar and a temperature of at least 300° C., where the converted feed stream (product mixture) comprises a mixture of $CO_2$ containing gas, an oil phase, an aqueous phase comprising water soluble organics and dissolved salts, and inorganic solid phase; where the product mixture is cooled to a temperature in the range 40 to 250° C., and depressurized to a pressure in the range 1 to 30 bar, the method comprising separating a gas comprising $CO_2$ from the product mixture in a degasser such as a flash separator, and separating a water phase from the at least partly degassed converted feed mixture in a first separation step of the separation, and adding washing agents in the form of an acidifying agent and a diluent to the at least partly degassed and at least partly dewatered product mixture, and separating the mixture with added washing agents into an oil rich phase, a water rich phase and a solid rich phase in a second step of the separation process, and further at least partly recovering the diluent from the oil rich phase.

In an advantageous embodiment an aqueous washing agent is added to the oil rich phase from the second separation step, and the mixture separated into at least a further purified oil rich phase and a water rich phase in a third separation step, and at least partly recovering the diluent from the further purified oil rich phase.

Advantageously the first separation step and/or second separation step and/or third separation step is performed by centrifugation. Hereby the centrifugation in the first separation step and/or second separation step and/or third separation step is performed in a disc bowl centrifuge, a decanter centrifuge or a basket centrifuge or a combination thereof.

Further, the centrifugation in the first separation step, preferably comprises a two-phase separation.

The centrifugation in the first separation step and/or second separation step and/or third separation may be performed in one or more disc-bowl centrifuges operating at least 3000 rpm such as at least 6000 rpm; preferably operating at least 8000 rpm such as at least 10000 rpm. Hereby the centrifugation in the first separation step and/or second separation step and/or third separation may be performed in one or more disc-bowl centrifuges operating at an elevated gravity of at least 5000×g such as at least 8000× g; preferably operating at least 10000×g such as at least 12000×g.

In a further embodiment the centrifugation in the first separation step and/or second separation step and/or third separation may be performed in one or more nozzle disc bowl centrifuges.

The centrifuge(-s) in the first separation step and/or second separation step and/or third separation may be adapted to eject of a concentrated solid phase with a frequency of no less than 60 seconds between ejects such as no less than 90 seconds between ejects; preferably the centrifuge(-s) may be adapted to eject of a concentrated solid phase with a frequency of no less than 150 seconds between ejects such as no less than 200 seconds between ejects; advantageously the centrifuge(-s) may be adapted to eject of a concentrated solid phase with a frequency of no less than 250 seconds between ejects such as no less than 300 seconds between ejects.

In an embodiment the at least partly recovered diluent is at least partly recycled and being added to the at least partly degassed and at least partly dewatered product mixture after the first separation step.

In an embodiment the step of at least partly recovering the diluent from the further purified oil rich phase is performed by an evaporation and/or distillation technique.

In an embodiment the step of at least partly recovering the diluent from the further purified oil rich phase is performed by one or more flash steps thereby producing a gas stream comprising low boiling hydrocarbons and a water and an oil stream.

In an embodiment the water content of the further purified oil is reduced to below 3.0% by weight such as below 2.0% by weight; preferable the water content of the further purified oil is below 1.5% by weight such as below 1.0% by weight; advantageously the water content of the further purified oil to the water content is reduced to below 0.5% by weight such as below 0.1% by weight.

In an embodiment the separated water rich phase from the second separation step is recycled and added to the at least partly degassed and at least partly dewatered product mixture after the first separation step.

In an embodiment a make-up acidifying agent is added to the recycled water rich phase from the second separation step or to the at least partly degassed and at least partly dewatered product mixture after the first separation step.

In an embodiment a bleed stream is withdrawn from the separated water rich phase from the second separation step prior to being added to the at least partly degassed and at least partly dewatered product mixture from the first separation step.

In an embodiment the separated water rich phase from the third separation step is at least partly recycled and added to the oil rich phase after the second separation step.

In an embodiment a make-up aqueous washing agent is added to the recycled water rich phase from the third separation step or to the oil rich phase after the second separation step.

In an embodiment a bleed stream is withdrawn from the separated water rich phase from the third separation step prior to being added and mixed with the oil rich phase after the second separation step.

In an embodiment the bleed stream withdrawn from the separated water rich phase from the third separation step is recycled and added to the separated water rich phase from the second separation step after withdrawing a bleed stream.

In an embodiment the pH of the at least partly degassed and dewatered product mixture is in the range 1.5 to 6.0 after addition of the one or more washing agents such as a pH in the range 2 to 5, preferable the pH of the at least partly degassed and dewatered product mixture is in the range 2.0 to 4.0 after addition of the washing agents such as in the range 2.5 to 3.5.

In an embodiment the acidifying agent comprises carbonic acid, acetic acid, citric acid, sulphuric acid, nitric acid, phosphoric acid, hydrochloric acid, oxalic acid or a combination thereof.

In an embodiment the concentration of the acidifying agent being added is in the range 0.05 M to 2.0 M such as in the range 0.1-1.0 M.

In an embodiment the weight ratio of the acidifying agents to the at least partly degassed and dewatered product mixture is in the range 0.05 to 4.0, such as in the range 0.1 to 2.0 preferable the weight ratio of the acidifying agents to the at least partly degassed and dewatered product mixture is in the range 0.2 to 1.2.

In an embodiment the one or more washing agents a diluent having a boiling point of less than 160° C. such as less than 130° C.; preferably the diluent has a boiling point of less than 120° C. such as less than 100° C.

In an embodiment the diluent comprises one or more ketones such as acetone, and/or propanones, and 2-heptanone and/or buthanones such as Methyl Ethyl Ketone (MEK, 2-butanone) and/or pentanones, and or pentenones and/or cyclopentanonees such as 2,5 dimethyl-cyclo-pentanone and/or hexanones and/or hexanones such as 3,3-methyl hexanones and/or cyclohexanones and/or heptanones, and/or one or more alcohols such as methanol, ethanol, propanol, isopropanol butanol, isobuthanol and/or one or more aromatic compounds such as toluene, xylene, cumene, ethyl benzene, 1,2,4 trimethyl benzene, 1,3,5 trimethyl benzene, 1,2,3 trimethyl benzene, phenols, phenol-formaldehyde resin and/or one or more alkanes such as pentanes, hexanes, heptanes, octanes, nonanes, decanes, dodecanes, and/or heavy and light aromatic naphtha, and/or glutaraldehyde, 2-butanone, ethyl acetate, 1-propyl acetate, polymers of ethylene oxide, pentylamine, butyl acrylate, pyrrole, butyronitrile, pyridine and pyrazine or a combination thereof.

In an embodiment the diluent comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

In an embodiment the diluent comprises a low boiling point fraction of the oil from the converted feed mixture comprising carbonaceous material.

In an embodiment the weight ratio of the diluent added to the amount of the at least partly degassed and dewatered product mixture is in the range is in the range 0.01 to 3.0 or in the range 0.1 to 2.0; preferably in the range 0.1 to 1.0 such as 0.2 to 0.6.

In an embodiment the solid phase from the second separation comprise phosphourous in a concentration in the range 1-50% on a dry weight basis, and calcium in a concentration in the range 1-25% on a dry weight basis, and iron in a concentration in the range 1-35% on a dry weight basis, and aluminium in a concentration in the range 0.5-10% on a dry weight basis and silica in a concentration in the range 1-15% on a dry weight basis.

In an embodiment the solid phase from the second separator is used directly or in a refined form as a fertilizer and/or a soil amendment product.

In an embodiment the solid phase from the second separation is further dried to a dry solids phase and an aqueous phase containing diluent and/or a diluent rich phase.

In an embodiment the separated aqueous phase containing diluent and/or the diluent rich phase from the solids drying step is/are recycled and added to the separated water rich phase from the third separator, preferably after withdrawing a bleed stream.

In an embodiment the solids phase is further processed to phosphoric acid and/or mono calcium phosphate (MCP) and/or di calcium phosphate (DCP) and/or mono ammonium phosphate (MAP) and/or di-ammonium phosphate (DAP) and/or struvite (MgNH4PO4, MgKPO4).

In an embodiment waste water treatment precipitation chemicals such as ferric chloride and/or aluminum sulphate and/or aluminum chloride is recovered from the solids phase from the second separation.

In an embodiment the solid phase from the second separator is subjected to an acid dissolution step.

In an embodiment the acid for the dissolution step comprises sulphuric acid, hydrochloric acid, nitric acid or phosphoric acid.

In an embodiment the pH of the dissolution step is in the range 1.0-3.0, such as in the range 1.5-2.5.

In an embodiment the liquid from the dissolution step comprising dissolved P is separated from the residual solids and pH is increased to the range 3 to 7 such as 4 to 7 by addition of base, and passed through a fixed bed comprising a cation resin for removal of heavy metals.

In a preferred embodiment the dissolved phosphorous is precipitated by addition or further addition of a base.

In an embodiment the liquid from the dissolution step is mixed with the bleed of the water rich phase from the second separation step.

In an embodiment the base for said precipitation comprises ammonia.

In an embodiment the ammonia added is at least partly recovered from the separated gaseous product comprising $CO_2$ from the degasser and/or the water phase from the first separation step.

In an embodiment the base for said precipitation comprises lime and/or sodium hydroxide and/or potassium hydroxide.

In an embodiment a magnesium salt such as $MgCl_2$, $MgClO_2$, $MgClO_4$ is added to the liquid from the dissolution step and/or the water rich phase from the second separation step prior to or during the precitation.

In an embodiment the pH of the liquid after the precipitation is in the range 7.0 to 9.5 such as a pH in the range 7.5 to 9.0.

In an embodiment the precipitated phosphorous product is separated from the residual liquid by filtering and/or centrifugation.

In an embodiment heavy metals are recovered from the residual liquid.

In an embodiment heavy metals are removed from the liquids by ion exchange.

In an embodiment the ion exchange step comprises two or more fixed beds comprising cation resin.

In an embodiment the inorganic content of the carbonaceous material constitutes at least 5% of the dry weight of the carbonaceous material such as at least 10% of the dry weight of the carbonaceous material.

In an embodiment the inorganic content of the carbonaceous material constitutes up to 50% of the dry weight of the carbonaceous material such as up to 35% of the dry weight of the carbonaceous material, preferably the inorganic content of the carbonaceous material constitutes up to 30% of the dry weight of the carbonaceous material such as up to 25% of the dry weight of the carbonaceous material.

In an embodiment product mixture to be separated by the separation and purification method is characterized by comprising solids having a mean particle size in the range 0.1 to 500 µm such as a mean particle size in the range 1 to 250 µm, preferably in the range 1-100 µm such as 1-40 µm.

In an embodiment the product mixture to be separated is characterized by comprising solids having a maximum particle size in the range 0.1 to 500 µm such as a maximum particle size in the range 1 to 250 µm, preferably in the range 1-100 µm such as 1-40 µm.

In an embodiment product mixture to be separated by the separation and purification method is characterized by having an oil to solids ratio in the range 0.1 to 3.0 such as an oil to solids ratio in the range 0.5 to 1.5.

In an embodiment the content of phosphorous in the carbonaceous material is at least 0.5% on a dry weight basis such as a phosphorous content of at least 1.0% on a dry weight basis, preferably the phosphorous content of the carbonaceous material is at least 2.0 wt % on a dry basis such as a phosphorous content of at least 3.0% on a dry weight basis.

In an embodiment the phosphorous content of the carbonaceous material is up to 15% on a dry weight basis such as a phosphorous content is up to 10.0% on a dry weight basis, preferably the phosphorous content of the carbonaceous material is up to 6.0 wt % on a dry basis such as a phosphorous content of at up to 4.0% on a dry weight basis.

In an embodiment the nitrogen content of the carbonaceous material is at least 0.5% on a dry weight basis such as a nitrogen content of at least 1.0% on a dry weight basis, preferably the nitrogen content of the carbonaceous material is at least 2.0 wt % on a dry basis such as a nitrogen content of at least 3.0% on a dry weight basis.

In an embodiment the nitrogen content of the carbonaceous material is up to 10% on a dry weight basis such as a nitrogen content is up to 8.0% on a dry weight basis, preferably the nitrogen content of the carbonaceous material is up to 6.0 wt % on a dry basis such as a nitrogen content of at up to 4.0% on a dry weight basis.

In an embodiment the carbonaceous material comprises sludge from waste water treatment such as biosolids, sewage sludge, primary sludge, secondary sludge, digestate from anaerobic digestion of sludges or combinations thereof.

In an embodiment the carbonaceous material comprises sorted biogenic municipal waste and/or biogenic household waste or food waste.

In an embodiment the carbonaceous material comprises shredded or pulped biogenic municipal waste and/or shredded or pulped biogenic household waste and/or shredded or pulped food waste.

In an embodiment the carbonaceous material comprises manure such as dewatered livestock production.

In an embodiment the carbonaceous material comprises digestate from anaerobic digestion.

In an embodiment the carbonaceous material comprises a lignocellulosic material.

In an embodiment the carbonaceous material comprises two or more feedstocks.

In an embodiment the dry matter content of carbonaceous material in the feed mixture is at least 15% by weight such as at least 20% by weight.

In an embodiment the dry matter content of carbonaceous material in the feed mixture is in the range from about 15% by weight to 40 by weight such as in the range 15 to about 30% by weight.

In an embodiment the dry matter content of the carbonaceous material in the feed mixture is increased by adding one or more drier feedstocks to the feed mixture.

In an embodiment the drier feedstocks being added to the feed mixture have a moisture content of less than 60% by weight such as a moisture content of less than 50% by weight, preferable a moisture content of less than 20% such as a moisture content of less than 10%.

In an embodiment the feed mixture comprises potassium and/or sodium hydroxide in the form of a carbonate or hydroxide form, and the concentration of the potassium and/or sodium is at least 2% by weight such as at least 3% by weight, preferably at least 4% by weight such as at least 5% by weight.

In an embodiment the feed mixture comprises recycled water phase from the condensation of the separated gas comprising $CO_2$ in the degasser and/or separated water phase from the first separation step and/or separated water phase from the second separation step and/or separated water phase from the third separation step and/or separated water phase from the step of at least recovering diluent added to the further purified oil phase or a combination thereof.

In an embodiment the recycled water phase being added to the feed mixture prior to recycling to the feed mixture is concentrated by a factor of at least 2 such as being concentrated by a factor of at least 3 prior to being recycled to the feed mixture. Preferably the water phase is concentrated by a factor of at least 4 such as by a factor of at least 5 prior to being recycled to the feed mixture.

In an embodiment the yield of purified oil from the conversion of the feed mixture is at least 25% by weight of the dry ash free carbonaceous material such as at least at least 30% by weight of the dry ash free carbonaceous material; Preferable the conversion process at least 35% by weight of the dry ash free carbonaceous material such as at least 40% by weight of the dry ash free carbonaceous material.

In an embodiment the separated and purified oil is further subjected to an ion exchange step.

In an embodiment the ion exchanger comprises one or more cation resins.

Advantageously gas is separated from the converted feed stream (product mixture) in a flash separator prior to entering the first phase separator.

By applying such method for separating the content of water and/or inorganics such as ashes will be reduced significantly compared to previously known methods.

It should be noted that the method is defined as comprising separating the product mixture in gas phase comprising $CO_2$, a renewable crude oil phase (liquid hydrocarbon), a solids phase and a water phase comprising water soluble organics, dissolved salts and optionally suspended particles. This is intended to mean that the four phases comprises essentially gas, liquid hydrocarbon, solid particles and water, but it should be understood that each phase may also contain other components, where the subsequent further separation process serves the purpose of further purifying in particular the liquid hydrocarbon phase. It should further be appreciated that the word "liquid hydrocarbon" or oil in the present context is used to comprise a broad spectrum of products including such comprising not only hydrogen and carbon but also heteroatoms such as oxygen, sulphur, nitrogen and others.

A carbonaceous material according to the present invention may be in a solid form or may have a solid appearance, but may also be in the form of a sludge or a liquid. Further the carbonaceous material(-s) may be contained in one or more feedstock (input streams).

Non limiting examples of carbonaceous feedstock according to the present invention include biomass such as woody biomass and residues such as wood chips, saw dust, forestry thinnings, road cuttings, bark, branches, garden and park wastes & weeds, energy crops like coppice, willow, *miscanthus*, and giant reed; agricultural and byproducts such as grasses, straw, stems, stover, husk, cobs and shells from e.g. wheat, rye, corn rice, sunflowers; empty fruit bunches from palm oil production, palm oil manufacturers effluent (POME), residues from sugar production such as bagasse, vinasses, molasses, greenhouse wastes; energy crops like *miscanthus*, switch grass, sorghum, Jatropha; aquatic biomass such as macroalgae, microalgae, cyano bacteria; animal beddings and manures such as the fiber fraction from livestock production; municipal and industrial waste streams such as black liquor, paper sludges, off spec fibres from paper production; residues and byproducts from food production such as pomace from juice, vegetable oil or wine production; municipal solid waste such as sorted municipal solid waste, source sorted household wastes, restaurant wastes, slaughter house waste, sewage sludge, plastics, bitumen, lignite coal and combinations thereof.

Many carbonaceous materials according to the present invention are related to lignocellulose materials such as woody biomass and agricultural residues. Such carbonaceous materials generally comprise lignin, cellulose and hemicellulose and in case of waste materials also proteins and eventually lipids.

An embodiment of the present invention includes a carbonaceous material having a lignin content in the range 1.0 to 60 wt. % such as lignin content in the range 10 to 55% wt. %. Preferably the lignin content of the carbonaceous material is in the range 15 to 40 wt. % such as 20-40 wt. %.

The cellulose content of the carbonaceous material is preferably in the range to 60 wt. % such as cellulose content in the range 15 to 45% wt. %. Preferably the cellulose content of the carbonaceous material is in the range 20 to 40 wt. % such as 30-40 wt. %.

The hemicellulose content of the carbonaceous material is preferably in the range 10 to 60 wt. % such as cellulose content in the range 15 to 45% wt. %. Preferably the cellulose content of the carbonaceous material is in the range 20 to 40 wt. % such as 30-40 wt. %.

Through the inventive solution a significant contribution to the reduction of the carbon intensity is achieved, and a significant contribution to the circularity in raw material consumption is further achieved, which will provide long term impact on sustainability in resources with limited availability, such as phosphorus and other nutrients. At the same time heavy metal may be removed providing an additional beneficial contribution to the environmental impact.

BRIEF DESCRIPTION OF THE DRAWINGS

The invention will be described in more detail in the following detailed description, with reference to embodiments shown in the drawings, where.

DESCRIPTION OF A PREFERRED EMBODIMENT

Figure 1:
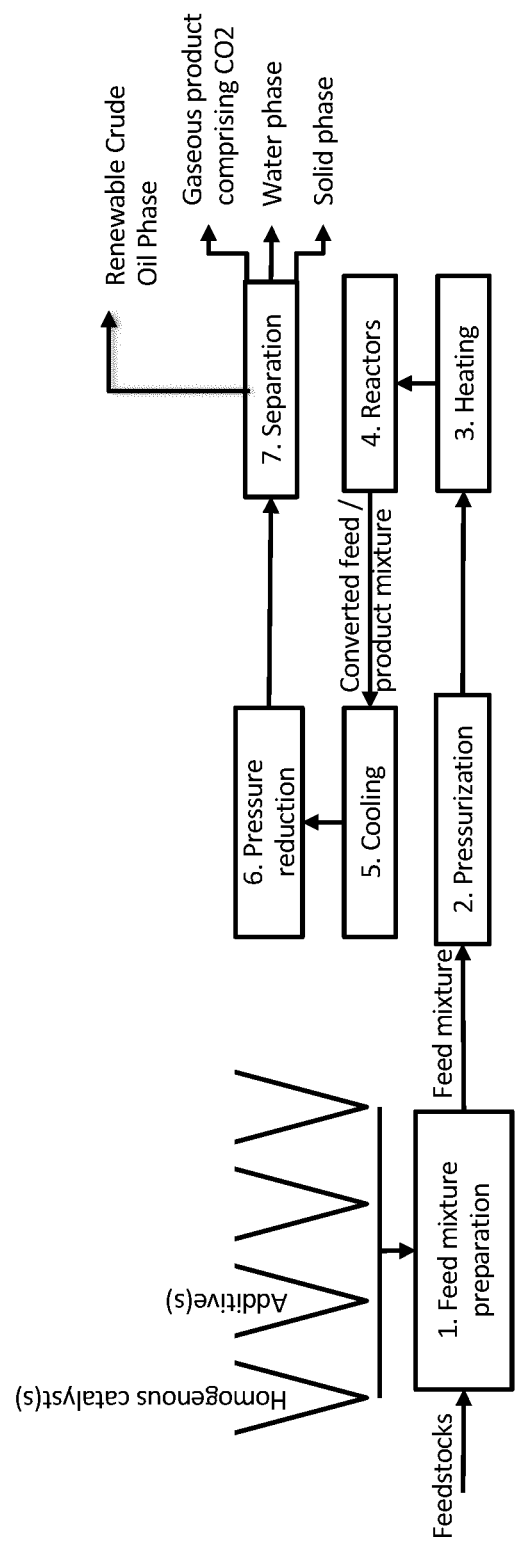
FIG. 1 shows a schematic overview of a continuous high pressure process for converting carbonaceous material into a renewable crude oil, a gaseous product comprising $CO_2$, a water phase and a solid phase.

FIG. 1 shows an embodiment of a continuous high pressure production process for conversion of carbonaceous material such as biomass and waste to a renewable crude oil phase, a gaseous product comprising $CO_2$, a water phase comprising water soluble organics, dissolved salts and optionally emulsified renewable oil, and a solid phase.

As shown in FIG. 1, one or more feedstock comprising carbonaceous material is first subjected to a feed mixture preparation step (1). The feed mixture preparation step transforms the feedstock into a pumpable feed mixture comprising the carbonaceous material and other ingredients such as water and optionally in the form of recycled water phase comprising dissolved salts (homogeneous catalyst(s)), water soluble organics and eventually emulsified oil, as well as other additives such catalysts, base for pH adjustment and other organics in the feed mixture. For embodiment where water phase is recycled from the separation step, the recycled the water phase may be concentrated in a recovery step (not shown) prior to being added in the feed mixture preparation step.

For some feed stock such as dewatered sludge from waste water treatment, the feed mixture preparation comprises mixing the feedstocks with the various ingredients and additives, and may be performed in planetary mixer, Kneader or Banbury mixer or inline in a static mixer or in a pump such as a double screw pump. However, the feed mixture preparation often further includes mechanical means for size reduction and homogenization of the carbonaceous material.

In a preferred embodiment of the present invention, the feed mixture may be preheated in the feed mixture preparation step or subsequent to the feed mixture preparation, and prior to pressurization to the final pressure. The feed mixture may according to a preferred embodiment be preheated to a temperature in the range from about 80° C. to about 250° C. in the pretreatment step such as temperature in the range from about 100° C. to about 220° C. Preferably the feed mixture is preheated to a temperature in the range from about 120° C. to about 200° C. such as in the range from about 130° C. to about 200° C.

Advantageously this is performed by transferring heat from other process stream e.g. from cooling the product mixture and is typically performed via a heat transfer medium such as hot oil or steam, whereby the overall heat recovery and energy efficiency are increased.

The second step is a pressurization step (2) where the feed mixture is pressurized by pumping means to a pressure of at least 100 bar and up to about 450 bar such as a pressure of least 150 bar and up to 400 bar; preferably the feed mixture is pressurized by pumping means to a pressure above the critical point of water such as a pressure of least 221 bar; more preferably the feed mixture is pressurized by pumping means to a pressure of at least 300 bar such as at least 320 bar. A particularly preferred embodiment according to the present is a feed mixture pressure after the pumping means of 320 to 350 bar.

The pressurized feed mixture is subsequently heated to a reaction temperature in the range from about 300° C. and up to about 430° C., such as a temperature in the range from about 340° C. to about 420° C.; preferably the pressurized feed mixture is subsequently heated to a reaction temperature in the range from about 350° C. and up to about 410° C., such a temperature in the range from about 370° C. to about 410° C.

The feed mixture is generally maintained at these conditions in sufficient time for conversion of the carbonaceous material e.g. for a period of 2 to 30 minutes, such as in the range 3 to 20 minutes; and preferably in the range 5 to 15 minutes, before it is cooled and the pressure is reduced.

The converted feed mixture i.e. the product mixture comprising renewable crude oil, water with water soluble organics, dissolved salts and optionally emulsified renewable crude oils, gaseous product comprising carbon dioxide, hydrogen, and methane as well as suspended solid particles from said converted carbonaceous material is subsequently cooled to a temperature in the range 40° C. to 250° C. such as in the range 40 to 200° C. However, in many applications according to the present invention the product mixture is cooled to a temperature in the range 40 to 150° C. such as a to a temperature in the range 40 to 120° C. Advantageous embodiments of the present invention include embodiments where the product mixture is cooled to below the boiling point of water such as a temperature in the range 50 to 100° C.

The cooled product mixture thereafter enters a pressure reducing device, where the pressure is reduced from the conversion pressure to a pressure of less than 100 bar such as a pressure of less than 80 bar. Preferably the pressure is reduced to less than 50 bar such as less than 30 bar. According to many applications of the present invention the pressure is reduced to a pressure of less than 10 bar such as a pressure close to ambient pressure.

Suitable pressure reduction devices include pressure reduction devices comprising a number of tubular members in a series and/or parallel arrangement with a length and internal cross section adapted to reduce the pressure to desired level, and pressure reducing devices comprising pressure reducing pump units.

The cooled and depressurized converted feed mixture is further separated into at least a gaseous product comprising carbon dioxide, hydrogen, carbon monoxide, methane and eventually other short hydrocarbons ($C_2$-$C_4$), alcohols (e.g methanol, ethanol), ketones (e.g. acetone) and eventually saturated with water, a renewable crude oil phase, a water phase with water soluble organic compounds as well as dissolved salts and a solid rich phase comprising suspended particles such as inorganics. Salts dissolved in the water phase include homogeneous catalyst and inorganics typically include metal or alkali or alkaline earth metals such as aluminium, calcium, magnesium, sodium, potassium, silica, iron, cobalt, nickel, phosphorous. The inorganics originate from the carbonaceous feedstock materials such as biomass and/or from homogenous catalyst(-s) applied in the high pressure production process.

The renewable crude oil may further be subjected to an upgrading process (not shown) where it is pressurized to a pressure in the range from about 20 bar to about 200 bar such as a pressure in the range 50 to 120 bar, before being to a temperature in the range 300 to in one or more steps and contacted with hydrogen and heterogeneous catalyst(s) contained in one or more reaction zones at a temperature of 300 to 400° C., and eventually fractionated into relevant boiling point fractions.

Efficient removal of contaminants such as inorganics in the form of alkali metals such as potassium and sodium, alkali earth metals such as calcium and magnesium and metals such as iron, nickel, cobalt, aluminum, manganese, silicium and phosphorus is critical for the catalyst performance and lifetime, whereas low concentrations of water is important for the overall performance of the upgrading process.

Figure 2:
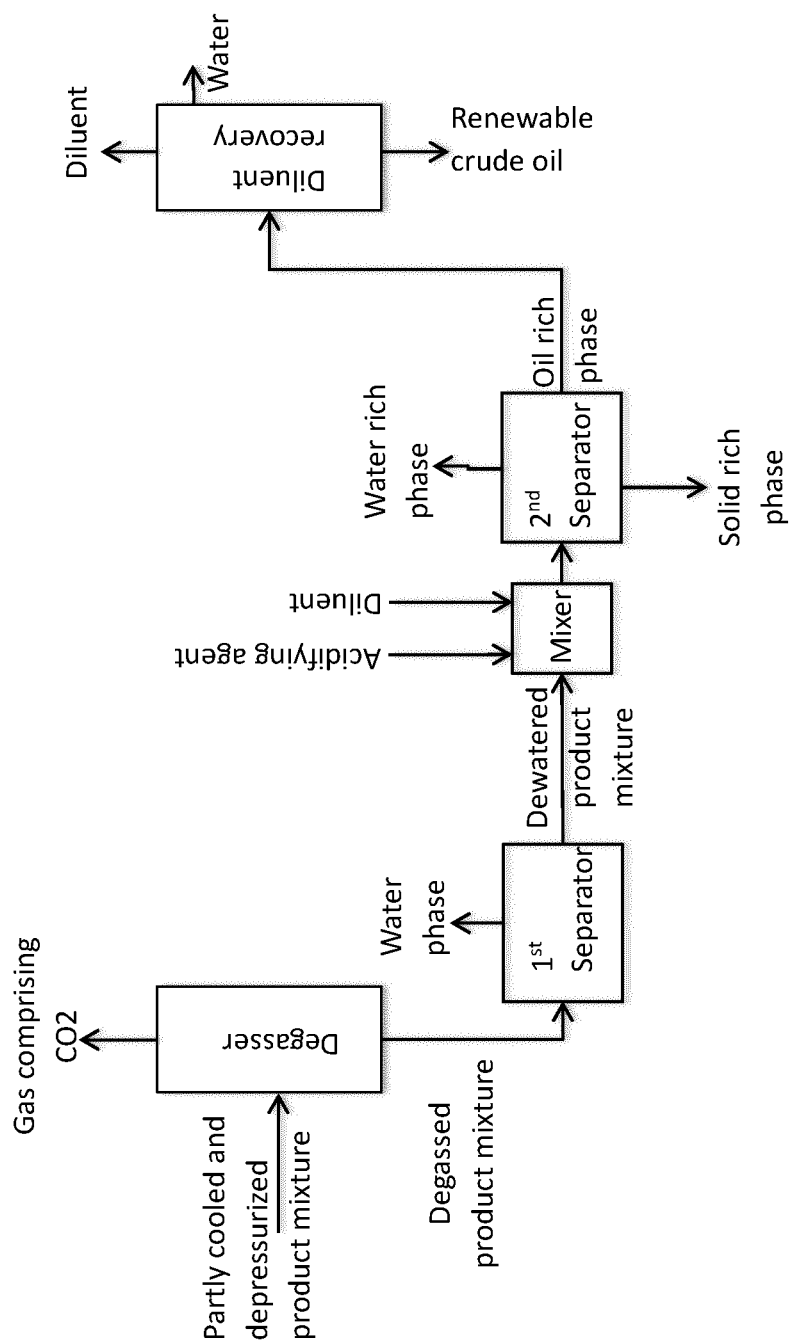
FIG. 2 shows a schematic overview of a first embodiment of a separation and purification system according to the invention.

FIG. 2 shows a schematic overview of a first embodiment of a separation and purification system according to the present invention.

The partly cooled and partly depressurized product mixture described above under FIG. 1 is first degassed in a degasser such as a flash separator whereby a gas comprising $CO_2$ and a degassed product mixture are produced. The separated gas may further comprise gases such as $H_2$ such as carbon monoxide, $C_1$-$C_6$ hydrocarbons, $H_2S$, $NH_3$, smaller alcohols, aldehydes, ketones as well as low boiling compounds of the oil ("lights"), and water. The gas from the flash separator is cooled to condense the condensable part of the gas phase like water, smaller alcohols, aldehydes and ketones as well the low boiling fraction and is further separated from the non-condensable part of the gas. The condensable part of the gas may be further separated into a water rich phase and an organic/light phase e.g. by gravimetric phase separation.

The degassed product mixture is in some applications according to the present invention present as a stable emulsion of renewable crude oil, water phase with dissolved salts, water soluble organics and eventually emulsified oil and solids, that typically only very slowly separate gravimetrically into a water phase and a partly dewatered product mixture.

Hence, according to an embodiment of the present invention the degassed product mixture is fed to a first separator as shown FIG. 2, where the degassed product mixture is separated into a water phase and an at least partly degassed product mixture comprising the renewable crude, residual water and solids.

The at least partly degassed and dewatered product is withdrawn from the first separator and mixed with an acidifying agent and optionally a diluent prior to entering into the second separator according to the present invention.

Typically it is advantageous to add acidifying agent so as to obtain a pH in the range from about 1.5 to about 6.0 of the mixture after addition of the one or more washing agents such as a pH in the range from about 2.0 to about 5.0. In many applications the pH of the at least part degassed and dewatered product mixture is in the range from about 2.0 to to about 4.0 after addition of the washing agents such as in the range 2.5 to 3.5. By reducing the pH to the desired range it is obtained that the separation is improved e.g. the content of residual inorganics is reduced. It is further obtained that the inorganics such as phosphorous are at least partly dissolved in the acidified water phase.

By reducing the pH to the specified ranges according to the present invention it is obtained that compounds such as potassium and sodium that may be bound to acidic groups of the oil as soaps are dissolved, and the separation efficiency is improved. Further the solubility of metals are also increased by reducing the pH. Still further at too low pH it has been found that stable emulsions may be formed.

Suitable acidifying agents according to the present invention include carbonic acid, acetic acid, citric acid, sulphuric acid, nitric acid, phosphoric acid, hydrochloric acid, oxalic acid or combinations thereof.

The concentration of the acidifying agent being added may in many applications be in the range 0.05 M to 2.0 M such as in the range 0.1-1.0 M.

The weight ratio of the acidifying agents added to the at least partly degassed and dewatered product mixture is often in the range 0.05 to 4.0, such as in the range 0.1 to 2.0 preferable the weight ratio of the acidifying agents to the at least partly degassed and dewatered product mixture is in the range 0.2 to 1.2.

The diluent being added to the at least partly degassed and dewatered product mixture may result in a de-emulsifying effect and/or a density reducing effect and/or a viscosity reducing effect that improves efficiency of the separation e.g. reduces the ash content of the renewable crude oil after the second separated. Further diluent may improve dissolution of organic particles and/or improve the hydrophobicity of the oil phase. Hereby, the separation efficiency is further improved.

A particularly preferred diluent according to the present invention is a diluent having a boiling point of less than 160° C. such as less than 130° C.; preferably the diluent has a boiling point of less than 120° C. such as less than 100° C. By having a boiling according to these specifications recovery of the diluent is easier.

Suitable diluents according to the present invention includes one or more ketones such as acetone, and/or propanones, and 2-heptanone and/or buthanones such as Methyl Ethyl Ketone (MEK) and/or pentanones, and or pentenones and/or cyclopentanonees such as 2,5 dimethylcyclo-pentanone and/or hexanones and/or hexanones such as 3,3-methyl hexanones and/or cyclohexanones and/or heptanones, and/or one or more alcohols such as methanol, ethanol, propanol, isopropanol butanol, isobuthanol and/or one or more aromatic compounds such as toluene, xylene, cumene, ethyl benzene, 1,2,4 trimethyl benzene, 1,3,5 trimethyl benzene, 1,2,3 trimethyl benzene, phenols, phenol-formaldehyde resin and/or one or more alkanes such as pentanes, hexanes, heptanes, octanes, nonanes, decanes, dodecanes, and/or heavy and light aromatic naphtha, and/or glutaraldehyde, 2-butanone, ethyl acetate, 1-propyl acetate, polymers of ethylene oxide, pentylamine, butyl acrylate, pyrrole, butyronitrile, pyridine and pyrazine or a combination thereof.

An advantageously embodiment is where the diluent comprises a mixture of three or more solvents.

A particularly preferred diluent according to the present invention comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

An advantageous diluent according to the present invention comprises a low boiling point fraction of the oil from the converted feed mixture.

The weight ratio of the diluent added to the amount of the at least partly degassed and dewatered product mixture is in the range is in the range 0.01 to 2 or in the range 0.1 to 1.0; preferably in the range 0.1 to 0.6 such as 0.2 to 0.4.

The dewatered product mixture with the washing agents in the form of an acidifying agent and a diluent is fed to the second separation step, where it is separated into a oil rich phase, a water rich phase and a solid rich phase.

The oil rich phase is according to the present invention further subjected to a diluent recovery step such as an evaporation step such as a flash separation in one or more steps and/or distillation step, where the diluent is at least partly recovered and separated from the renewable crude oil and water.

The water content of the renewable oil after diluent recovery is typically reduced to below 3.0% by weight such as below 2.0% by weight; preferable the water content of the renewable oil is below 1.5% by weight after the diluent recovery step such as below 1.0% by weight; advantageously the water content of the renewable oil is reduced to below 0.5% by weight after the diluent recovery step such as below 0.1% by weight.

Advantageously the separation in the first separation step and/or second separation step is performed at an elevated gravity such as by centrifugation. Suitable centrifugation techniques include basket centrifuges, decanter centrifuges and/or disc bowl centrifuges or a combination thereof.

The centrifugation in the first separation step is according to the present invention preferably performed as a two-phase centrifugation, and the centrifugation in the second step is preferably performed as a three phase centrifugation.

Disc bowl centrifuges are according to the present invention found to be particularly advantageous for many applications.

Advantageously the centrifugation in the first separation step and/or second separation step is/are performed in one or more disc bowl centrifuges operating at least 3000 rpm such as at least 6000 rpm; preferably operating at least 8000 rpm such as at least 10000 rpm.

The elevated gravity typically used in the centrifugation in the disc bowl centrifuges in the first separation step and/or second separation step is/are according to many aspects of the present invention performed by operating the disc bowl centrifuge(-s) at an elevated gravity of at least 5000×g such as at least 8000×g; preferably operating at least 10000×g such as at least 12000×g.

The disc bowl centrifuges used in the first separation step and/or the second separation step may comprise nozzle disc bowl centrifuges for continuous solids discharge. However, in many embodiments of the present invention the solids are intermittently discharged from the centrifuge, when the solids level in the centrifuge reaches at predefined level. In many applications of the present invention the solids load is high, which may result in a too frequent solids discharge and related instable operation that reduce the separation efficiency and/or the capacity of the centrifuge if the capacity for solids collection has insufficient capacity.

Hence, the centrifuges in the first separation step and/or the second separation step according to the present invention is/are typically adapted to eject of a concentrated solid phase with a frequency of no less than 60 seconds between ejects such as no less than 90 seconds between ejects; preferably the centrifuge(-s) is/are adapted to eject of a concentrated solid phase with a frequency of no less than 150 seconds between ejects such as no less than 200 seconds between ejects; advantageously the centrifuge(-s) is/are adapted to eject of a concentrated solid phase with a frequency of no less than 250 seconds between ejects such as no less than 300 seconds between ejects.

Figure 3:
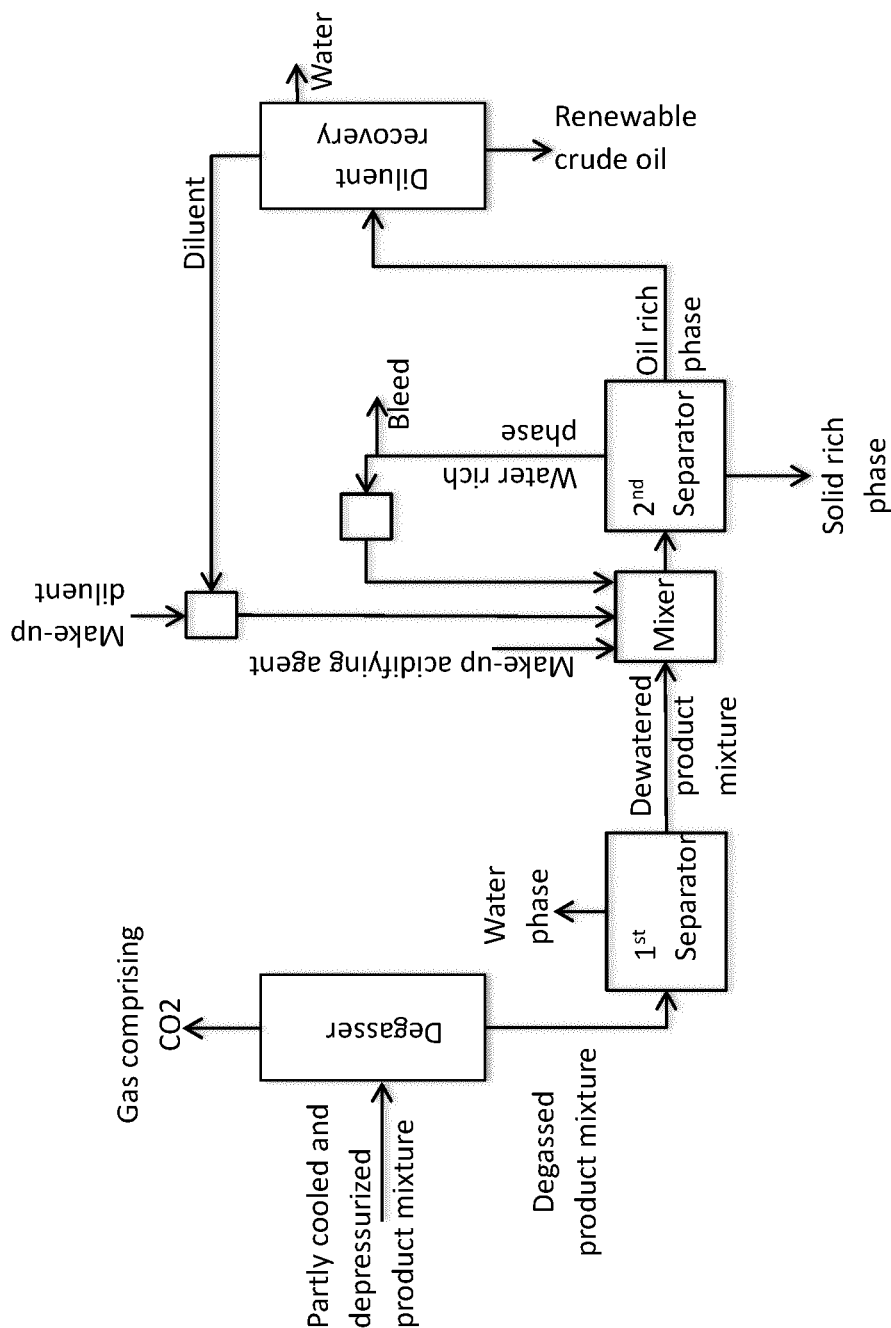
FIG. 3 shows a schematic drawing of preferred embodiment of a separation and purification system according to the invention further comprising recycle of the separated water rich phase from the second separator and recovered diluent.

FIG. 3 shows a preferred embodiment of a separation and purification system according to the present invention, where the separated water rich phase from the second separator is recycled and reuse and added as part of the acidifying washing agent added to the at least partly degassed and dewatered product mixture prior to the second separation step.

As shown on FIG. 3 a bleed stream may be withdrawn from the separated water rich phase prior to recycling and addition to the at least partly degassed and dewatered product mixture prior to the second separation step. A make-up acidifying agent is further added. The make-up acidifying agent according to the present invention may be added to the recycled water rich phase from the second separation step subsequent to withdrawing the bleed stream or may be added to the at least partly degassed and at least partly dewatered product mixture from the first separation step prior to entering the second separation step. By recycling the water rich phase from the second separator the consumption of acidifying agent, water and diluent in the second separation step is reduced and a more cost efficient process is obtained. Further, a more controlled and higher concentration of dissolved species can be obtained in the bleed stream.

The recovered diluent may according to many embodiments of the present invention at least partly be recycled and reused in the diluent addition step prior to the second separation step.

Part of the recovered diluent may according to an embodiment of the present invention be reintroduced to the renewable oil after reduction of the water content in the recovery step.

Figure 4:
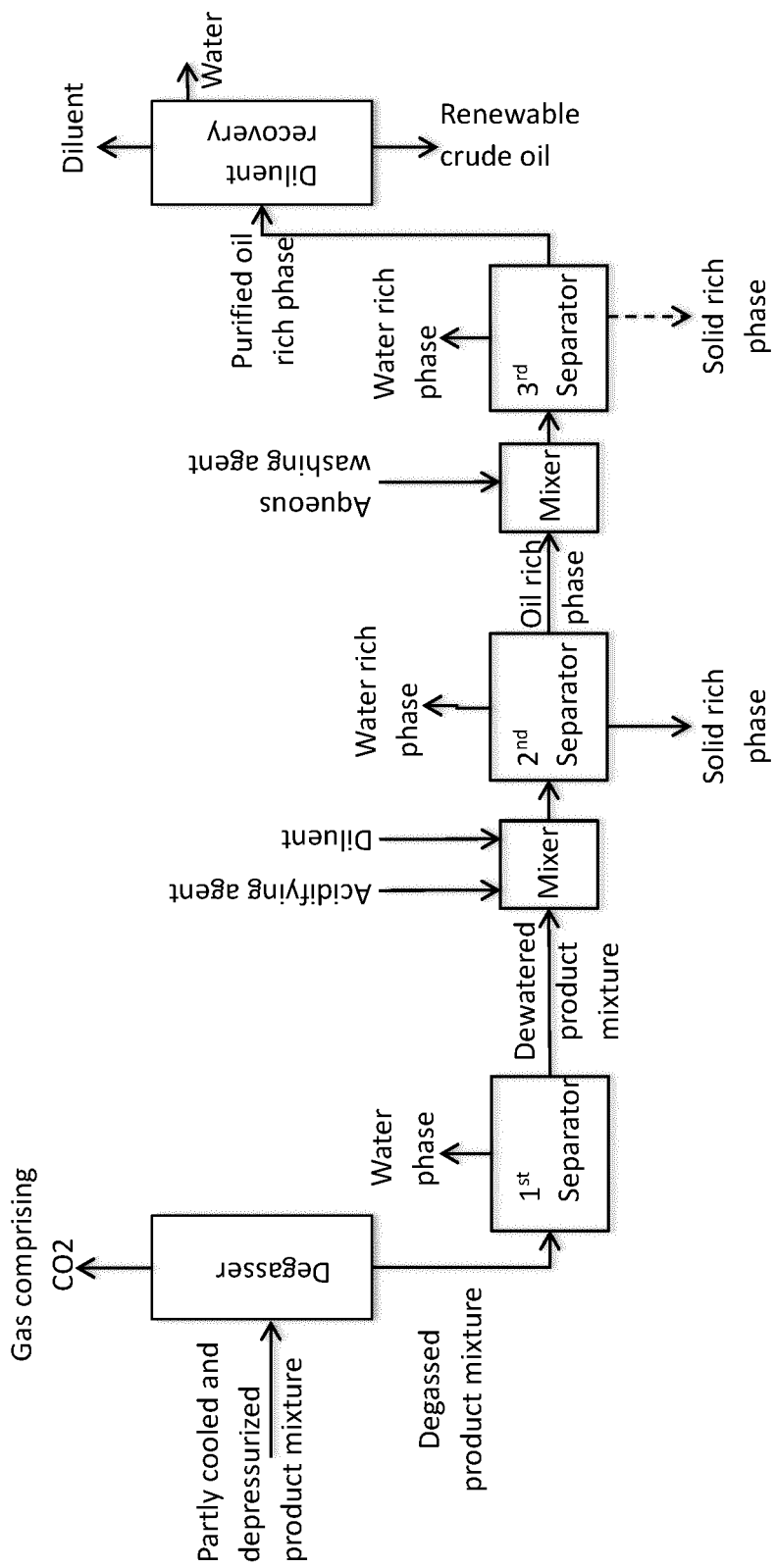
FIG. 4 shows a schematic overview of another preferred embodiment of a separation and purification system according to the invention, further comprising a third separator.

FIG. 4 shows a schematic overview of another preferred embodiment of a separation and purification system according to the invention further comprising a third separation step. Typically, an aqueous washing agent is added to the oil rich phase from the second separation step prior to the third separator and the mixture separated into at least a further purified oil rich phase and a water rich phase in a third separation step. The further purified oil phase is preferably fed to a diluent recovery step, where the diluent added prior to degassed and dewatered product mixture from the first separator prior to the second separator is at least partly recovered from the further purified oil rich phase.

In many aspects of the present invention, the third separation step is performed by a centrifugation technique. An advantageous embodiment is where the centrifugation is performed in a high-speed disc bowl centrifuge.

By applying a third step of separation, the separation efficiency is further improved e.g. the residual ash content and/or the residual water content and/or the residual acid content of the further purified oil from the third separation step and/or the water content of is further reduced.

Figure 5:
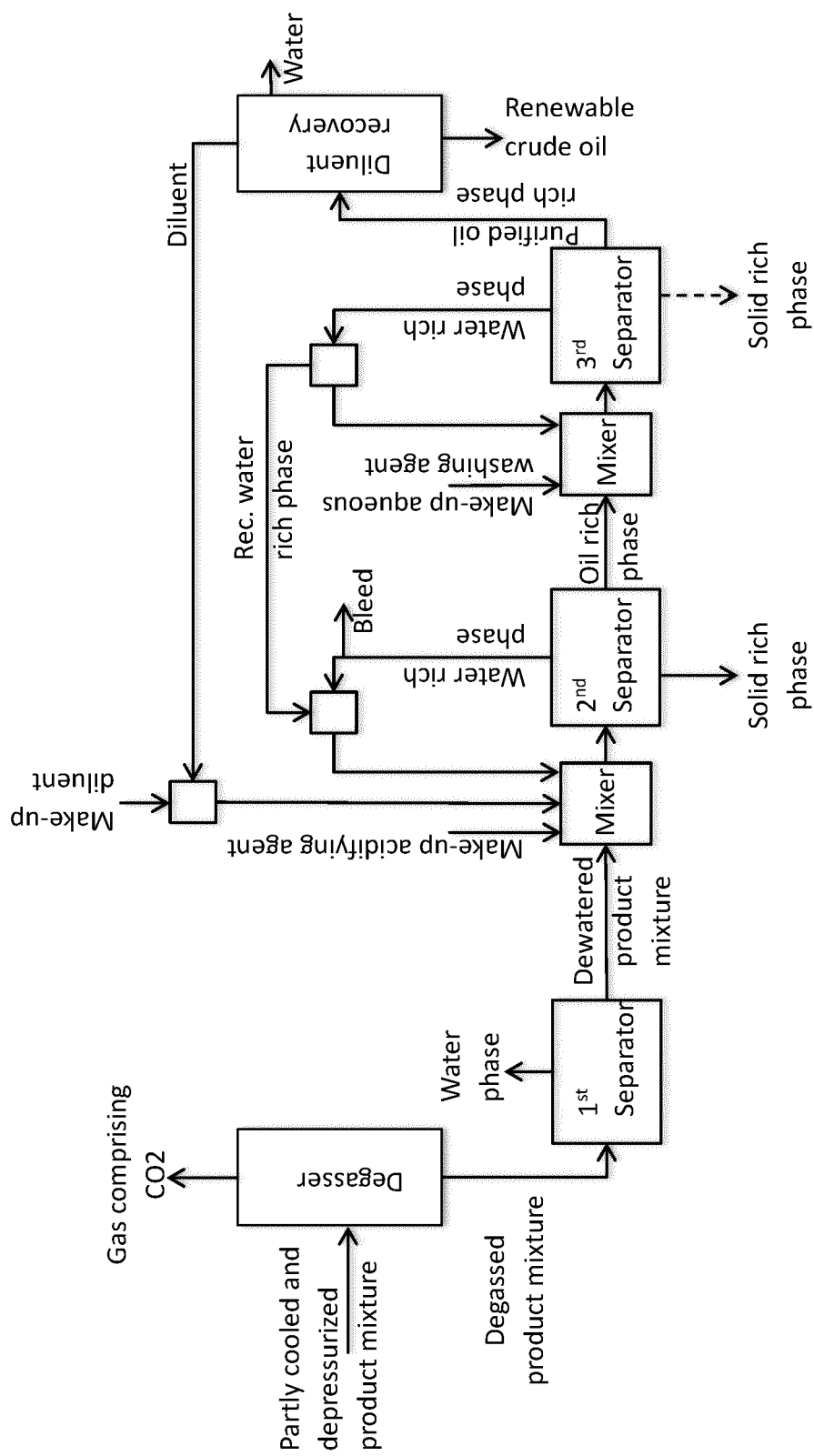
FIG. 5 shows a schematic overview of an advantageous embodiment of a separation and purification system according to the invention, further comprising recycling the separated water rich phase from the third separation step.

FIG. 5 shows a schematic overview of an advantageous embodiment of a separation and purification system according to the invention, further comprising recycling the separated water rich phase from the third separation step. The aqueous washing water is recycled and added to the oil rich phase from the second separation after withdrawing a bleed stream for recycle and reuse in the second separation step. As the water rich phase often is acidic and may further comprise diluent and eventually water-soluble organics from the oil.

By recycling and reusing the aqueous washing agent the water and/or acid and/or the diluent consumption is reduced and a more efficient and cost-effective process is obtained.

In many aspects of the invention, the ash content of the separated and purified oil after the separation and purification system according to the invention is less than 5000 ppm by weight or less than 3000 ppm by weight; preferably less than 2000 ppm or less than 1000 ppm; more preferably the ash content of the separated and purified oil after the separation system according to the invention is less than 500 ppm by weight or less than 250 ppm by weight; even more preferably the ash content of the separated and purified oil after the separation system according to the invention is less than 150 ppm by weight or less than 100 ppm by weight.

Figure 6:
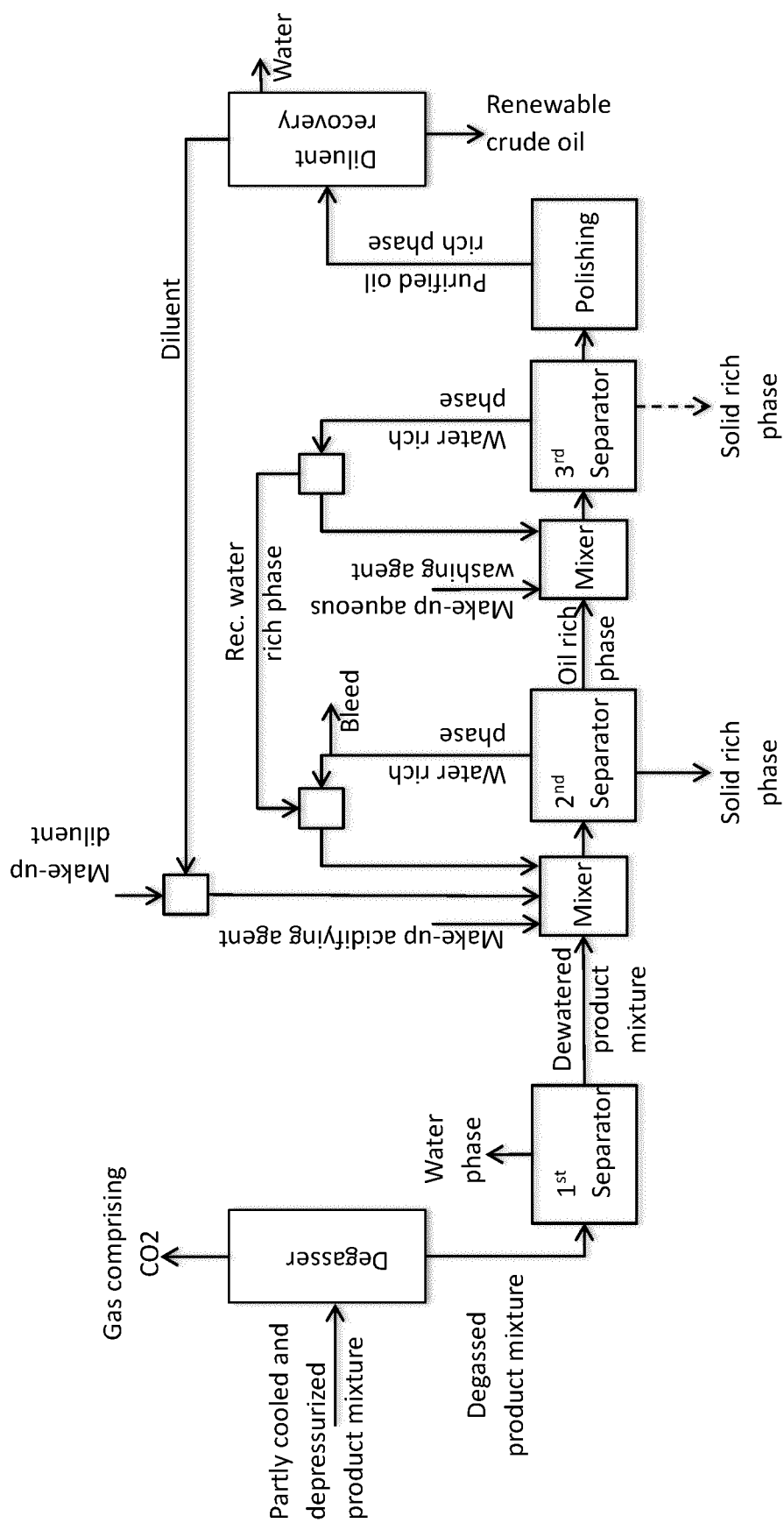
FIG. 6 shows a schematic overview of another advantageous embodiment of a separation and purification system according to the invention comprising a further polishing step of the further purified oil from the third separation step.

FIG. 6 shows a schematic overview of another advantageous embodiment of the present invention further comprising a further polishing step of the further purified oil prior to the diluent recovery step. In some aspects of the present invention, the further polishing step may comprise a filtering step where the further purified oil is filtered prior to entering the diluent recovery step. Suitable filters may have a mesh size of up to 100 microns, such as up to 50 microns. Preferable the mesh size of the is up to 30 micron such as up to 10 microns.

In other aspects of the invention, the further polishing step comprises or further comprises one or more ion exchange step(-s). The ion exchange step may be comprise a cation selective resin for removing residual alkali metals such as potassium and/or sodium, alkali earth metals such as calcium and/or magnesium and/or metals such as iron, nickel, cobalt, manganese, aluminium, silicium, phosphorus or a combination thereof. The ion exchange resin may in some aspects of the invention be added in the form of a powder or beads upstream said one or more filtration step(-s) and filtered from the oil in said filtration step(-s). In another preferred embodiment said ion exchange resin may be contained in one or more fixed beds arranged an a series and parallel arrangement. Typically, the fixed beds are arranged with a valve arrangement and means so that at least one fixed bed can be online and at least one ion exchanger can be offline for cleaning such as by back flushing by an acid such as e.g. hydrochloric acid or sulphuric acid.

In many aspects of the invention, the ash content of the separated and purified oil after the separation and purification system according to the invention is less than 500 ppm by weight or less than 300 ppm by weight; preferably less than 200 ppm or less than 100 ppm; more preferably the ash content of the separated and purified oil after the separation system according to the invention is less than 50 ppm by weight or less than 25 ppm by weight; even more preferably the ash content of the separated and purified oil after the separation system according to the invention is less than 15 ppm by weight or less than 10 ppm by weight.

Figure 7:
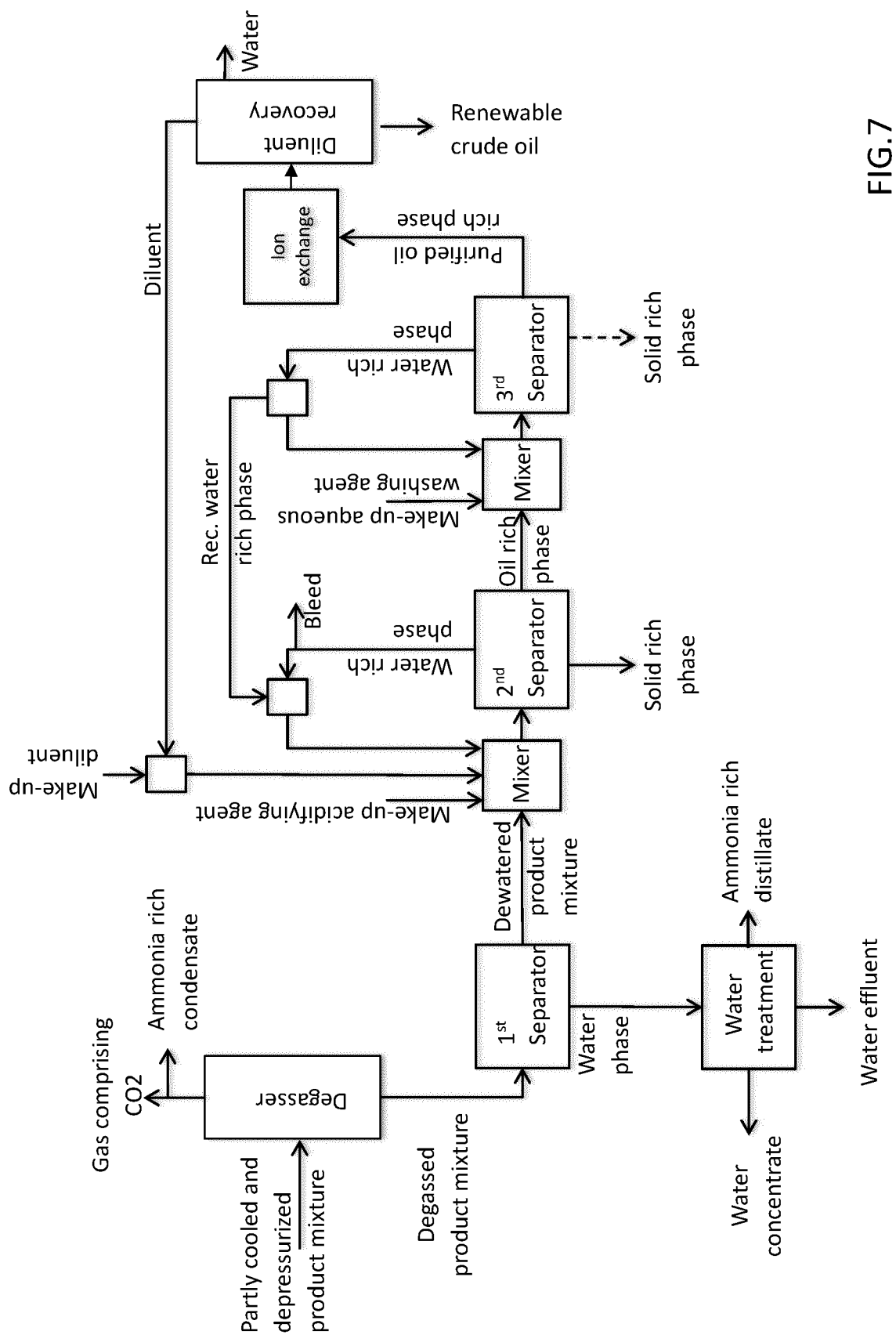
FIG. 7 shows a schematic overview of a preferred embodiment comprising further treatment system for the water phase from the first separator.

FIG. 7 shows a schematic overview of a preferred further treatment system for the water rich phase from the first separator. The water phase from the first separator often comprises dissolved salts such as homogeneous catalysts in the form of sodium and potassium, as well as ammonium and carbonates, and water-soluble organics such as smaller alcohols, aldehydes, ketones, acids as well as emulsified renewable crude oil.

According to an advantageous embodiment of the present invention, the water phase is treated in a water phase recovery unit, where it is further separated into at least a water phase concentrate comprising liquid organic compounds in the form of water soluble organics and/or homogeneous catalysts in a more concentrated form, and/or an ammonia rich stream, and/or an alcohol and ketone rich stream and/or a water stream substantially free of the above mentioned streams.

The water phase concentrate and the alcohol and ketone rich stream is according to the present invention typically recycled to the feed mixture preparation step. Hereby the yield of renewable oil, energy efficiency and process economy is improved. The ammonia rich stream is according to a preferred embodiment used for neutralization of the water rich stream from the second separator as further described below.

A preferred embodiment of said water phase recovery unit comprises one or more membrane processes such as a combination of two or more membrane processes selected among reverse osmosis, ultrafiltration, microfiltration and/or membrane distillation steps.

In an advantageous embodiment the water phase recovery device, comprises one or more evaporation and/or distillation step(-s), wherein water, ammonia and lighter compounds is evaporated from the water phase, and thereby providing at least one distillate and a water phase concentrate.

The degree of concentrating the water phase is selected so as to provide a distillate amount that corresponds to the amount of water added with the carbonaceous material, homogeneous catalyst and make-up base in the pre-treatment.

Typically, the ratio of concentrate to the water phase entering the recovery unit is typically in the range from about 0.1 to about 0.9 such as in the range 0.2 to 0.8. Often the ratio of concentrate to the combined water phases entering the recovery unit is in the range from about 0.25 to about 0.7 such as in the range 0.3 to 0.6. In other embodiments of the present invention the ratio of concentrate to the combined water phases entering the recovery unit is typically in the range from about 0.25 to about 0.6 such as in the range 0.3 to 0.6.

In an advantageous embodiment of the present invention, the water phase entering the recovery unit is subjected to a first stripping step as part of the recovery unit remove or reduce the amount of volatile and/or low boiling compounds entering the further evaporation and/or distillation steps thereby preventing excessive gas flows in the subsequent evaporation and/or distillation steps, and thereby improving the efficiency of these steps.

In a preferred embodiment, the first stripping step comprises an air stripping or steam stripping step, which produces a stream enriched in ammonia and/or low boiling organics such as methanol, ethanol, propanol, acetone etc. and a stream depleted in ammonia and/or methanol, ethanol, propanol, acetone etc.

The stream enriched in ammonia and/or low boiling organics such as methanol, ethanol, propanol, acetone etc. may be condensed by cooling and the gas separated from the condensed phase in a separator. The remainder gas phase from the condensation and separation step may according to a preferred embodiment be subjected to an acidic absorption step, where it is contacted with an acidic absorption step. The absorbent used in said absorption step may be and acid such as sulphuric acid. In a further preferred embodiment the acidic absorbent used in said absorption step may comprise the water rich stream from the second separator.

The water phase may be preheated to a temperature of e.g. 70-130° C. such as a temperature in the range 80 to 115° C. before entering into the evaporation and/or distillation part of said water phase recovery unit. The heat for said preheating is preferably provided by heat recovery from a process stream and/or from the outgoing distillate stream before entering into the one or more evaporator and/or distillation steps. In the evaporator, water is evaporated from the water phase comprising water soluble organics and dissolved salts at a temperature from about 100° C. to about 115° C. In these embodiments the heat recovery from said process stream may be performed via a heat transfer medium such as a hot oil or steam.

The pH of the combined water phase entering the water phase recovery unit is according to the present invention preferably maintained and adjusted to be at alkaline conditions such as in the range 7 to 14 such as a pH in the range 8 to 12, preferably the pH of the water phase to the recovery unit is maintained in the range 8 to 11. The maintaining and adjustment of the pH in the specified range is according to the present invention performed by measuring the pH and adding a base such as sodium hydroxide prior to the water recovery unit. Operating at such inlet pH to the recovery unit has the advantage of reducing the amount of phenolics in the distillate, and maximizes removal of ammonia from the water phase concentrate.

A preferred embodiment of said recovery step according to the present invention is where the recovery step comprises evaporation and/or distillation in two or more stages operating at a decreasing pressure and temperature and each being heated with the evaporated vapor from the foregoing step to minimize the heat required for the evaporation.

The evaporator may advantageously further comprise condensing said evaporated vapor in two or more condensation steps, where the condensation temperatures in said condensation steps are decreasing so as to obtain a fractionation of the evaporated fraction i.e. a fraction comprising water and eventually higher boiling compounds, and a fraction where compounds having a boiling point temperature lower than water are concentrated.

Preferably said evaporated vapor passes a demister and/or a foam breaker prior to condensation of said evaporated fraction by cooling. Advantageously the evaporator may according to the present invention further be equipped with a coalescer and an absorber, where the evaporated fraction is contacted with an absorbent. the absorbent comprises in a particularly preferred embodiment a base such as sodium hydroxide.

The evaporator according to the present invention may in some embodiments include increasing the condensation temperature of said evaporated water by increasing the pressure by a blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation does not need to be supplied to said evaporation step.

It should be noted that said condensers according to the present invention may comprise heat exchangers where the media to be concentrated are evaporated on the other side, but in general said evaporation step according to the present invention comprises at least one additional condenser compared to the number of evaporation steps.

The fraction comprising evaporated water ("distillate") may further be cooled to a temperature suitable for discharge in a cooler. Hereby, it is obtained that said evaporator besides recovering said liquid organic compounds and/or homogeneous catalysts also cleans and purifies the water phase in an efficient manner, and can produce a water phase that may be reused or discharged to a recipient. Optionally the "distillate" may be subjected to one or more polishing steps. Said polishing steps may include an absorber and/or adsorber and/or a coalescing step and/or a distillation step and/or a membrane system such as reverse osmosis and/or a biological treatment system such as a bioreactor.

In many applications according to the present invention a bleed or purge stream is withdrawn from said concentrated water phase prior to recycling to the feed mixture preparation step 1 to prevent buildup of compounds such as chloride.

Figure 8:
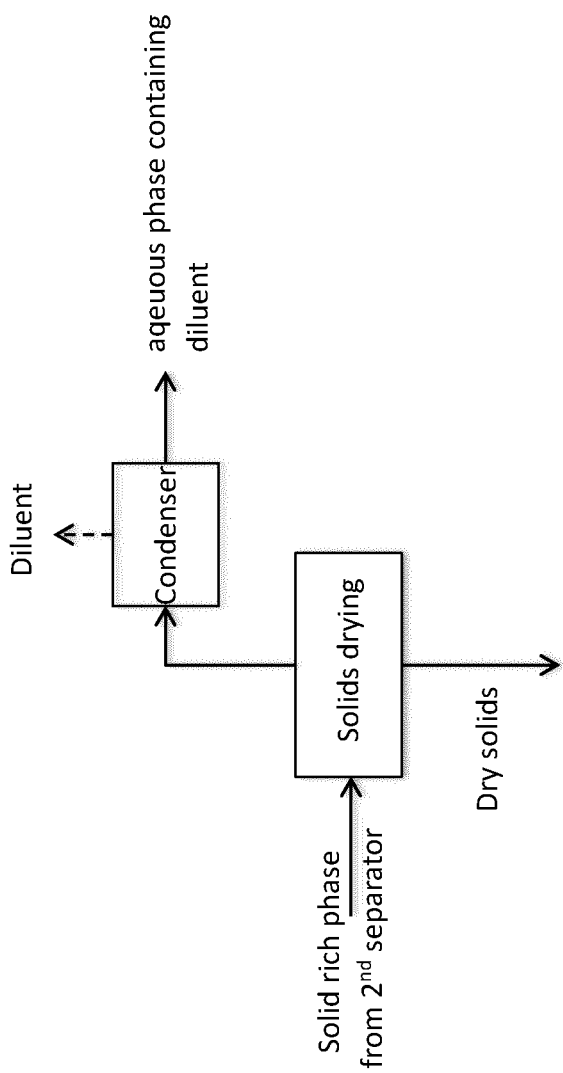
FIG. 8 shows a schematic overview of another advantageous embodiment of a separation and purification system according to the invention comprising a drying step of the separated solid phase.

FIG. 8 shows a schematic overview of another advantageous embodiment of the present invention further comprising a drying step, where the solid rich phase from the second separation stage and optionally the solid rich phase from the third separator is further dewatered and dried to a more concentrated form. The vapours from such drying step comprising water, volatile organic compounds and diluent are condensed and separated as an aqueous phase with water soluble organics and/or a diluent rich phase.

According to an advantageous embodiment of the present invention, said condensed aqueous phase with water soluble organics from said solids drying step are at least partly recycled and added to the separated water rich phase from the third separator after withdrawing a bleed stream.

According to another advantageous embodiment of the present invention, said condensed diluent phase from said solids drying step is at least partly recycled and reused as make-up diluent and mixed with the degassed and dewatered product mixture from separation stage 1.

In many aspects of the invention, the dry solids from the drying step comprise phosphorous in a concentration in the range 1-50% on a dry weight basis, and calcium in a concentration in the range 1-25% on a dry weight basis, and iron in a concentration in the range 1-35% on a dry weight basis, and silica in a concentration in the range 1-15% on a dry weight basis, and aluminium in a concentration in the range 0.5-10% on a dry weight basis.

According to an advantageous embodiment of the present invention, the dry solid phase from said drying step are used as a fertilizer and/or a soil amendment product.

Figure 9:
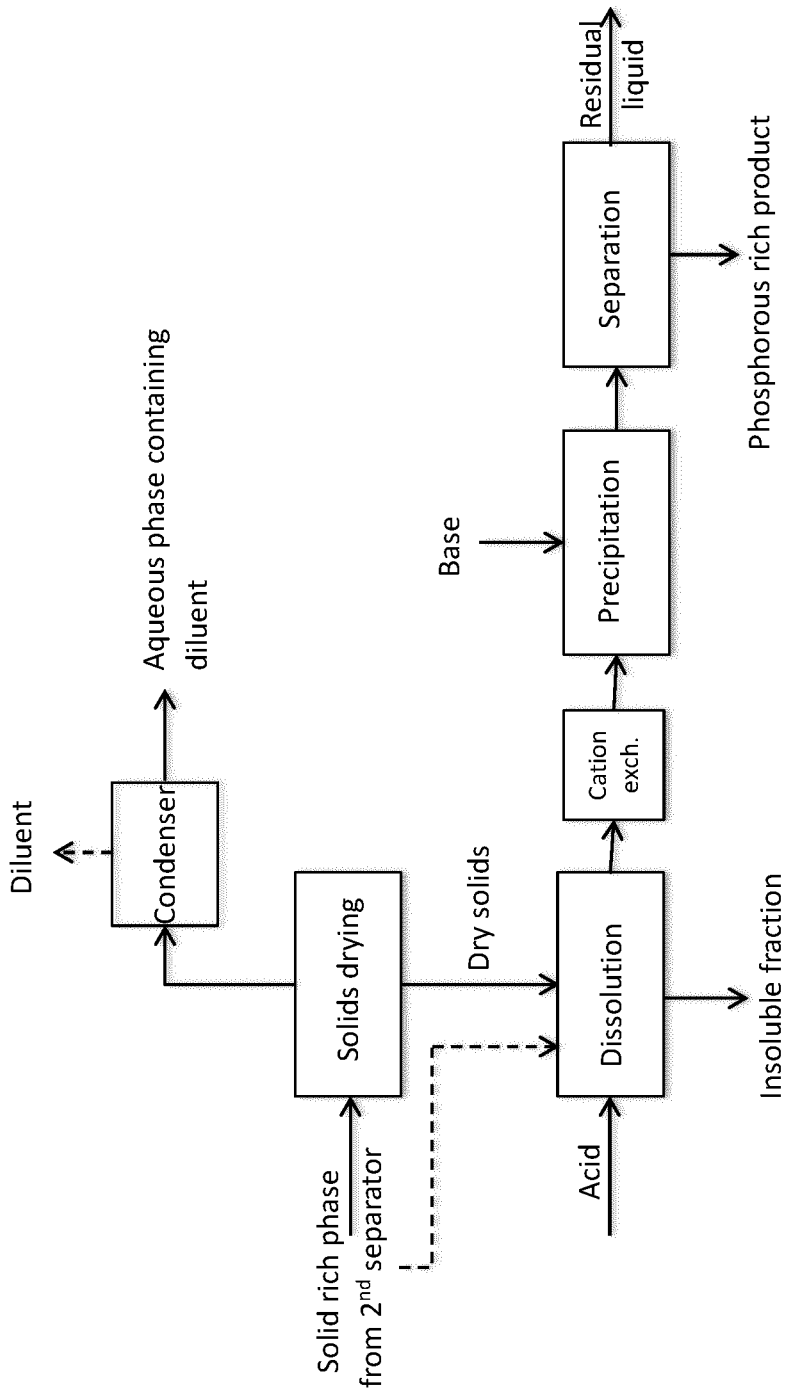
FIG. 9 shows a schematic overview of another preferred system for phosphorus recovery from the separated solid phase from the second separator according to the invention.

FIG. 9 shows a schematic overview of another advantageous embodiment of the present invention further comprising phosphorus recovery, where the solids phase is further processed to phosphoric acid and/or mono calcium phosphate (MCP) and/or di calcium phosphate (DCP) and/or mono ammonium phosphate (MAP) and/or di-ammonium phosphate (DAP) and/or struvite (MgNH4PO4, MgKPO4).

According to an advantageous embodiment of the present invention, waste water treatment precipitation chemicals such as ferric chloride, aluminum sulphate and aluminum chloride are recovered from the solids phase.

According to an advantageous embodiment of the present invention, it is the dry solids from the drying step which are processed for phosphorous recovery. In other aspects of the invention, the solid rich phase from the second separator is processed for phosphorous recovery.

In many aspects of the invention the phosphorous recovery comprise an acid dissolution step, where the solid rich phase from the second separator and/or the dry solids from the drying step are subjected to an acid dissolution step by dissolution in sulphuric acid, hydrochloric acid, nitric acid or phosphoric acid. Suitable pH of the dissolution step may be in the range 1.0-3.0, such as in the range 1.5-2.5. The liquid from the dissolution step comprising dissolved P is separated from the residual solids.

According to an advantageous embodiment of the present invention, the liquid from the dissolution step comprising dissolved P is mixed with the bleed of the water rich phase from the second separation step.

According to an advantageous embodiment of the present invention, a phosphorous rich phase is precipitated from the liquid from the dissolution step by addition of a base. Suitable base for said precipitation may comprise ammonia, and in a preferred embodiment the ammonia added is at least partly recovered from the separated gaseous product from the degasser and/or the water phase from the first separation step and/or from the water recovery unit. In other aspects of the present invention, suitable base for said precipitation may be lime and/or sodium hydroxide and/or potassium hydroxide.

According to an advantageous embodiment of the present invention, a magnesium salt such as $MgClO_4$ is added to the liquid from the dissolution step and/or the water rich phase from the second separation step prior to or during the precitation.

According to an advantageous embodiment of the present invention, the precipitated phosphorous rich product is separated from the residual liquid by filtering and/or centrifugation.

In many aspects of the invention, the pH of the residual liquid after the precipitation is in the range 7.0 to 9.5 such as a pH in the range 8.0 to 9.0. This residual liquid after the precipitation may be further processed to recover heavy metals. Such recovery of metals such as heavy metals like cadmium and/or mercury, may be performed by ion exchange, where the ion exchange step comprises two or more fixed beds comprising a cation resin.

The one or more fixed beds comprising the cation resin for removal of heavy metals according to the invention, further comprises a valve arrangement allowing to take a fixed bed off line for regeneration while at least one fixed bed comprising ion exchanger resin is maintained online. The regeneration of the cation resin being offline is according to the invention typically performed at predefined intervals by addition of an acid such as sulfuric acid.

In another aspect of the present invention, the recovery of metals such as heavy metals by ion exchange are at least partly performed on the liquid from the dissolution step prior to the precipitation of phosphorous products. This may in some embodiments be done at the same pH as for dissolution of phosphorous from the solids, but often is performed at a pH between the pH for the dissolution and the pH for precipitation of the phosphorous products such as at a pH in the range 3 to 7.

Figure 10:
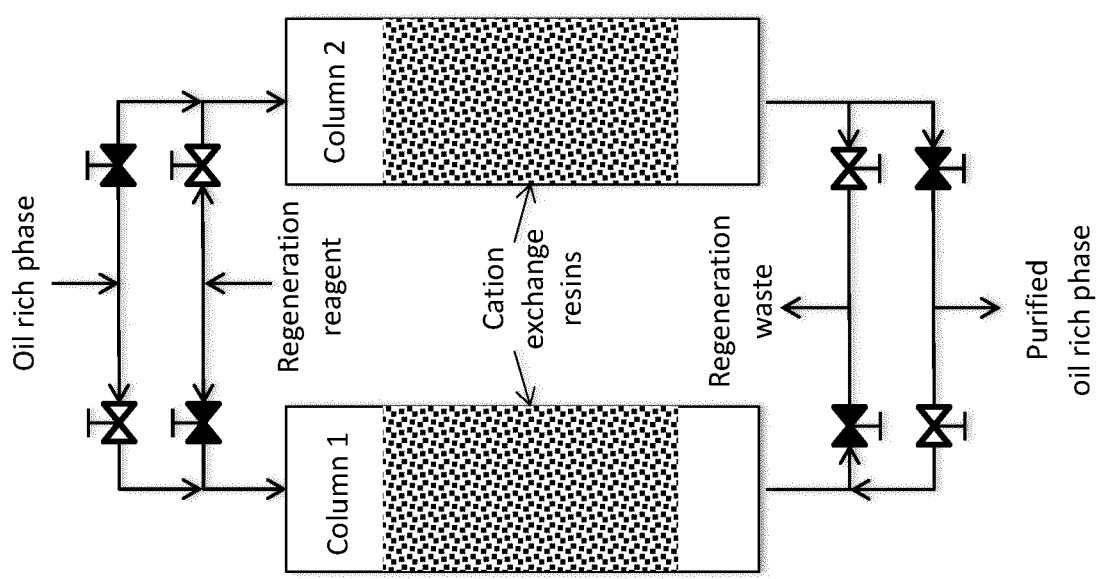
FIG. 10 shows a schematic overview of a further preferred system for phosphorous recovery from the separated solid rich phase from the second separator.

FIG. 10 shows a schematic of a preferred embodiment of polishing an ion exchange system comprising a cation resin for removal of metals from the purified oil rich phase from the third separator or the liquid comprising dissolved phosphorous compounds. The system comprised at least two columns (fixed beds) with the cation resin and a valve arrangement allowing to take a column off line for regeneration while at least one fixed bed comprising ion exchanger resin is maintained online, and further directing a regeneration fluid to the column being offline. The regeneration fluid for regeneration of the cation resin being offline is according to the invention typically performed at predefined intervals by addition of an acid such as sulfuric acid.

Example 1: Conversion of Non-Digested Sewage Sludge

A degassed product stream (converted feed mixture) was produced from conversion of dewatered undigested sewage sludge from a waste water treatment plant in Denmark. The sewage sludge had the composition shown under Sewage #1 in Table 1:

|  | Unit | Sewage, #1 | Sewage, #2 | Sewage, #3 | Standard |
| --- | --- | --- | --- | --- | --- |
| Sampling | dd-mm-yy | 07-10-19 | 11-05-20 | 25-05-20 |  |
| Carbon | wt. % | 52.2 | 50.0 | 50.4 | ASTM D 5291 |
| Hydrogen[a] | wt. % | 7.8 | 7.4 | 6.7 | ASTM D 5291 |
| Oxygen[a] | wt. % | 31.5 | 33.9 | 34.3 | Balance |
| Sulphur | wt. % | 1.0 | 0.9 | 0.9 | ASTM D 1552 A |
| Nitrogen | wt. % | 7.5 | 7.6 | 7.8 | ASTM D 5291 |
| Ash[b] | wt. % | 23.0 | 19.2 | 19.4 | ASTM D 482 |
| Phosphor[c] | wt. % | 2.7 | 0.5 | 0.5 | M-0071 DS 259/ICP |
| Chloride[c] | ppm | 1470 | 100 | 60 | SS-EN 15408 (mod.) |
| Potassium[c] | wt. % | 0.1 | 0.1 | 0.1 | M-0071 DS 259/ICP |
| HHV[a] | MJ/kg | 22.9 | 25.4 | 24.7 | ASTM D 240 |
| DM[c] | wt. % | 24.4 | 22.8 | 22.4 | EN14774-3 |

[a] correction for moisture underestimates hydrogen and overestimates oxygen content and HHV as volatile organics will be lost in moisture analysis,
[b] ash given on dry basis,
[c] as received.

The sewage sludge was subjected to a hydrothermal liquefaction process without recirculated water phase concentrate by preparing a feed stream by adding and mixing 2.4% of potassium carbonate and 2.4% of sodium hydroxide and 12.6% of deionized water to 82.6% of sewage sludge and subsequently pressurizing a flow of 30 kg/hr to 330 bar, and heating it to approx. 400 C, cooling and depressurizing the converted feed mixture to atmospheric pressure. The partly cooled and depressurised product mixture were collected at 70-80 C in a product drum and gasses comprising $CO_2$ were dried by condensation and analysed. The gas compositions for 2 different mass balances are given in Table 1. Condensate was separated into an organic and aqueous phase, the latter having a high total nitrogen content.

TABLE 1

Gas composition (corrected for air) measured by SS-ISO 6974.

| Sample name | Unit | MB19-028 | MB19-031 |
|---|---|---|---|
| CH4 | Vol. % | 3.6 | 3.2 |
| CO2 | Vol. % | 79.9 | 74.0 |
| CO | Vol. % | 0.1 | 0.1 |
| H2 | Vol. % | 7.7 | 10 |
| Ethene | Vol. % | 0.91 | 0.91 |
| Ethane | Vol. % | 1.33 | 1.22 |
| Propene | Vol. % | 0.48 | 0.46 |
| Propane | Vol. % | 0.97 | 0.87 |
| C4 | Vol. % | 1.38 | 1.23 |
| Methanol | Vol. % | 0.12 | 0.05 |
| Ethanol | Vol. % | 0.18 | 0.07 |
| Acetone | Vol. % | 0.39 | 0.42 |

It was found that majority of the gas produced from the feed stream was easily separated from the remainder of the product mixture, but that the remaining product mixture, a stable brownish emulsion of oil and solid particles dispersed in an aqueous phase, only very slowly (hours) separated into a separate water phase and an oil-water-solid emulsion that even after several hours still contained significant amounts of water.

Upon spin test centrifugation of 50 ml, the degassed product mixture was separated into a separate water phase and an oil-water-solid emulsion bottom phase. The yields for 5 different mass balances are given in Table 2 together with the yields of gas condensates.

The at least partly dewatered product mixture contains about 20-40 wt. % ash and more than 20% water, which is very high and a major issue in terms of producing transportation fuels.

TABLE 2

Yields of products from the degasser.

| Sample name | Degassed product mixture kg | Separate Water phase* % | Dewatered Product mixture* % | Aq. Cond. Kg | Org. Cond. Kg |
|---|---|---|---|---|---|
| MB19-028 | 61.16 | 87.4 | 12.2 | 0.205 | 0.029 |
| MB19-029 | 63.56 | 83.5 | 16.0 | 0.184 | 0.023 |
| MB19-030 | 61.08 | 81.1 | 17.7 | 0.082 | 0.017 |
| MB19-031 | 53.27 | 82.5 | 17.1 | 0.063 | 0.016 |
| MB19-032 | 59.79 | 82.4 | 17.5 | 0.124 | 0.020 |

*WP and Oil/solids yields were obtained from lab centrifugation of the degassed product mixture at 4471 g for 20 min.

Example 2: Separation by Filtering

The oil-solid-water emulsion from example 1 was subjected to a filtration process using filters with mesh sizes 25 to 100 micron. Filtration of the oil-solid-water emulsion was tested both with and without addition of methyl ethyl ketone (MEK) as a solvent.

The trials resulted in very fast cloggings of the filters. This is due to the high inorganics content of the oil-solid-water emulsion. It was further found that the filters could not be regenerated through cleaning.

Example 3: Separation of Degassed Product Mixture by Centrifugation

The degassed product mixture from example 1 was subjected to a continuous centrifuge step configured in clarification mode and operating at 12000 rpm, comprising pumping the product mixture to a disc bowl centrifuge at a flowrate of 400 l/hr, separating said product mixture into a separate water phase, containing 0.2 wt. % solids, that is continuously discharged out of the centrifuge, and a partly dewatered product mixture that is accumulated in the centrifuge and ejected every 90 seconds, resulting in a partly dewatered product mixture comprising 25-35 wt % of oil, 30-40 wt % of solids (inorganics) with the remainder being water and dissolved gases.

Example 4: Separation by Centrifugation of Dewatered Product Mixture 86 kg of partly dewatered product mixture from Example 3 was mixed with 86 kg of MEK (diluent) and 179 kg 0.2M citric acid (acidifying agent). The mixture was thoroughly mixed at 20 C and pumped to an ATEX classified disc bowl centrifuge configured as purifier/clarifier with nitrogen purge. The flowrate was varied from 120 to 240 liters per hour. The centrifuge was running at a bowl speed of 12000 rpm and with solids discharge every 90 to 130 seconds. An oil rich phase, a water rich phase and a solid rich phase were collected.

Example 5: Optimised Separation by Centrifugation of Dewatered Product Mixture

Partly degassed and dewatered product mixture have been obtained from a preferred embodiment of the hydrothermal liquefaction process similar to Example 1, but where water concentrate has been recirculated and mixed with the sewage sludge. 100 kg of the dewatered product mixture is thoroughly mixed with washing agents, 50 kg MEK (diluent) and 50 kg 1.0M citric acid solution, and fed to a disc bowl centrifuge at 9000 rpm (12000 g) and at a flow rate of 150 kg/hr, thereby separating the feed mixture into an oil rich phase, a water rich phase and a solid rich phase.

The oil rich phase was further mixed with deionized water in a 1:1 weight ratio and separated in the disc centrifuge to majorly an oil rich phase and a water rich phase, but trace solids were also collected in the solids chamber of the disc centrifuge. The water rich phase was reused for further separation. The oil rich phase contained about 1000 ppm ash.

Example 6: Diluent Recovery from Oil Rich Phase

The oil rich phase obtained from Example 5 is processed in a rotary evaporation unit for simulation of diluent recovery in a flash/distillation process. The evaporation conditions were ramped down from 240 mbar vacuum to 60 mbar vacuum and a heating bath temperature of 60 C to first evaporate methyl ethyl ketone (MEK) (diluent) and further dewater the oil rich phase.

About 30-50% of renewable crude oil was collected after the evaporation with the rest being diluent and water. Properties of the renewable crude oil obtained after diluent recovery is given in the table below:

TABLE 4

Characteristics of sewage sludge derived oil obtained after separation according to a preferred embodiment of the current invention. All analysis performed by certified laboratories unless specified otherwise.

| Property | Unit | Sewage Oil | Standard |
|---|---|---|---|
| Elemental composition (daf): | | | |
| Carbon | wt. % | 77.4 | ASTM D5291 |
| Hydrogen | wt. % | 9.8 | ASTM D5291 |
| Nitrogen | wt. % | 3.7 | ASTM D5291 |
| Sulphur | wt. % | 0.8 | ASTM D1552 A |
| Oxygen | wt. % | 8.2 | By difference |
| H/C mole-ratio (daf) | — | 1.51 | Calculated |
| HHV (daf) | MJ/kg | 37.4$^a$ | ASTM D240 |
| Ash content | wt. % | 0.17$^a$ | ASTM D 482 |
| Metals | ppm | 901 | M-0071 DS 259 |
| Micro carbon residue (daf) | wt. % | 11.4$^a$ | |
| Water content | wt. % | 0.99 | ISO 6296 |
| Density @ 15° C. | kg m$^{-3}$ | 999.0 | ASTM D4052 |
| Density @ 40° C. | kg m$^{-3}$ | | ASTM D4052 |
| Kinematic viscosity: | | | |
| @ 40° C. | mm$^2$/s | 141.9 | ASTM D445 |
| @ 50° C. | mm$^2$/s | 81.5 | ASTM D445 |
| @ 60° C. | mm$^2$/s | | |
| @ 100° C. | mm$^2$/s | 12.4 | Calculated |
| Total acid number | mg KOH /g | 67 | ASTM D664 A |
| Pour point | ° C. | −3 | ASTM D97 |
| Flash Point | ° C. | 36$^a$ | ASTM D97 |

$^a$measured internally.

Example 7: Solid Product from Centrifugation

The solid rich fraction obtained from Example 5 was dried and evaluated as potential fertiliser/soil additive for agricultural or gardening purposes. The composition is given in Table 5. The major inorganic elements can be derived from the ICP analysis given in Table 9. Phosphorous comprise 32% of the detected metals, iron represents 26%, calcium 14%, potassium 9%, sodium 8%, aluminum 6% and magnesium represents 4%, which sums up to 99%. Except sodium and aluminum, these are all critical plant nutrients, indicating that the solid byproduct from Hydrofaction™ of sewage could be a sustainable and valuable fertilizer. Sodium and aluminum can reduce the soil quality if present in too high concentrations, but the concentrations of both are relatively low, and the presence of calcium outweighs the negative impact of sodium. The concentration of heavy metals is relatively low and acceptable compared to current legislation.

TABLE 5

| DM | Ash | HHV | HHV (daf) | C | H | N | S | O | H/C |
|---|---|---|---|---|---|---|---|---|---|
| 98.6 wt. % | 75.2 wt. % | 8.3 MJ/kg | 35.5 MJ/kg | 17.3 wt. % | 2.1 wt. % | 1.2 wt. % | 0.48 wt. % | 3.7 wt. % | 1.45 |

| Metals by ICP [mg/kg] | | | | | | | | | | |
|---|---|---|---|---|---|---|---|---|---|---|
| Al | P | Sb | As | Ba | Pb | B | Cd | Ca | Cr | Co | Fe |
| 13800 | 78100 | 4.05 | 17 | 369 | 52 | 15 | 5.35 | 34000 | 60 | 5.52 | 64200 |
| K | Cu | Hg | Mg | Mn | Mo | Na | Ni | Se | Tl | V | Zn |
| 22500 | 320 | 0.8 | 10600 | 370 | 16 | 19000 | 47 | 2 | 2.04 | 23 | 1660 |

Example 8: Production of MAP/DAP and Struvite from Solid Product 50 ml of water rich phase obtained from separation as described in Example 4 containing 1.9 g/L of phosphor, is mixed with 1.7 g of MB19-028 aqeuous gas condensate produced as part of Example 1. NaOH 0.2 g was added under stirring until pH of the mixture is 8.8, while white crystals were forming. The mixture was filtered and diammonium phosphate crystals were obtained.

Through the inventive solution a significant contribution to the reduction of the carbon intensity is achieved, and a significant contribution to the circularity in raw material consumption is further achieved, which will provide long term impact on sustainability in resources with limited availability, such as phosphorus and other nutrients. At the same time heavy metal may be removed providing an additional beneficial contribution to the environmental impact.

The invention claimed is:

1. A method of separating and purifying products from a hydrothermal and/or solvothermal conversion process of carbonaceous material adapted to convert a teed stream comprising carbonaceous material at a pressure of at least 100 bar and a temperature of at least 300° C., wherein the converted feed stream comprises a mixture of $CO_2$ containing gas, an oil phase, an aqueous phase comprising water soluble organics and dissolved salts, and inorganic solid phase; Wherein the converted feed stream is cooled to a temperature in the range 40 to 250° C., and de-pressurized to a pressure in the range 1 to 30 bar, the method comprising:
    separating a gas comprising $CO_2$ from the converted feed stream in a degasser;
    separating a water phase from the at least partly degassed converted feed stream in a first separation step of the separation;
    adding washing agents in the form of an acidifying agent and a diluent to the at least partly degassed and at least partly dewatered converted feed stream;
    separating the converted feed stream with added washing agents into an oil rich phase, a water rich phase and a solid rich phase in a second separation step of the separation; and
    at least partly recovering the diluent from the oil rich phase,
wherein the first separation step and/or second separation step is/are performed by centrifugation.

2. The method according to claim 1, wherein an aqueous washing agent is added to the oil rich phase from the second separation step, and the converted feed stream separated into at least a further purified oil rich phase and a water rich phase in a third separation step, and at least partly recovering the diluent from the further purified oil rich phase, where the first separation step and/or second separation step and/or third separation step is/are performed by centrifugation.

3. The method according to claim 2, wherein the centrifugation in the first separation step and/or second separation step and/or third separation step is performed in a disc bowl centrifuge, a decanter centrifuge or a basket centrifuge or a combination thereof.

4. The method according to claim 1, wherein the centrifugation in the first separation step and/or second separation step is/are performed in a disc bowl centrifuge, a decanter centrifuge or a basket centrifuge or a combination thereof.

5. The method according to claim 4, wherein the centrifugation in the first separation step and/or second separation step is/are performed in one or more disc-bowl centrifuges operating at least 3000 rpm.

6. The method according to claim 5, wherein the centrifugation in the first separation step and/or second separation step is/are performed in one or more disc-bowl centrifuges operating at an elevated gravity of at least 5000×g.

7. The method according to claim 5, wherein the centrifugation in the first separation step and/or second separation step is are performed in one or more nozzle disc bowl centrifuges.

8. The method according to claim 4, wherein the centrifugation in the first separation step and/or second separation step is/are performed in one or more disc-bowl centrifuges operating at an elevated gravity of at least 5000×g.

9. The method according to claim 4, wherein the centrifugation in the first separation step and/or second separation step is/are performed in one or more nozzle disc bowl centrifuges.

10. The method according to claim 4, wherein the centrifuge(-s) in the first separation step and/or second separation step is/are adapted to eject of a concentrated solid phase with a frequency of no less than 60 seconds between ejects.

11. The method according to claim 1, wherein the pH of the at least partly degassed and dewatered converted feed stream is in the range 1.5 to 6.0 after addition of the one or more washing agents.

12. The method according to claim 11, wherein the acidifying agent comprises carbonic acid, acetic acid, citric acid, sulphuric acid, nitric acid, phosphoric acid, hydrochloric acid, oxalic acid or a combination thereof.

13. The method according to claim 12, wherein the concentration of the acidifying agent being added is in the range 0.05 M to 2.0 M.

14. The method according to claim 11, wherein the weight ratio of the acidifying agents to the at least partly degassed and dewatered converted feed stream is in the range 0.05 to 4.0.

15. The method of claim 1, wherein the one or more washing agents includes a diluent having a boiling point of less than 160° C.

16. The method according to claim 15, wherein the diluent is selected from one or more ketones, one or more alcohols, one or more aromatic compounds, or one or more alkanes.

17. The method according to claim 15, wherein the diluent comprises one or more ketones in a concentration in the range 30-60% by weight, and one or more alcohols in a concentration in the range 5-30% by weight, and one or more aromatics in a concentration in the range 10 to 40% by weight, and one or more alkanes in the concentration in the range 10 to 30% by weight.

18. The method according to claim 15, wherein the diluent comprises a low boiling point fraction of the oil from the converted feed stream comprising carbonaceous material.

19. The method according to claim 15, wherein the weight ratio of the diluent added to the amount of the at least partly degassed and dewatered converted feed stream is in the range is in the range 0.01 to 3.0 or in the range 0.1 to 2.0.

20. The method according to claim 1, wherein the inorganic content of the carbonaceous material constitutes at least 5% of the dry weight of the carbonaceous material.

* * * * *